(12) United States Patent
Chao et al.

(10) Patent No.: US 12,485,615 B2
(45) Date of Patent: Dec. 2, 2025

(54) PREPARATION METHOD FOR POLYMER COMPOSITE PARTICLE MATERIAL, AND THREE-DIMENSIONAL PRINTING METHOD BY USING POLYMER COMPOSITE PARTICLE MATERIAL

(71) Applicant: National Taiwan University of Science and Technology, Taipei (TW)

(72) Inventors: Yu-Deh Chao, Taipei (TW);
Jeng-Ywan Jeng, Taipei (TW);
Dong-Quan Yeh, Taipei (TW);
Pin-Cheng Wang, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 317 days.

(21) Appl. No.: 18/325,017

(22) Filed: May 29, 2023

(65) Prior Publication Data

US 2024/0293968 A1     Sep. 5, 2024

(30) Foreign Application Priority Data

Feb. 21, 2023    (TW) ................................ 112106195

(51) Int. Cl.
| | |
|---|---|
| *B29C 64/314* | (2017.01) |
| *B29C 64/153* | (2017.01) |
| *B33Y 10/00* | (2015.01) |
| *B33Y 40/10* | (2020.01) |
| *B33Y 70/00* | (2020.01) |
| *B29K 75/00* | (2006.01) |
| *B29K 77/00* | (2006.01) |
| *B29K 105/00* | (2006.01) |

(52) U.S. Cl.
CPC .......... *B29C 64/314* (2017.08); *B29C 64/153* (2017.08); *B33Y 10/00* (2014.12); *B33Y 40/10* (2020.01); *B33Y 70/00* (2014.12); *B29K 2075/00* (2013.01); *B29K 2077/10* (2013.01); *B29K 2105/0032* (2013.01); *B29K 2105/251* (2013.01)

(58) Field of Classification Search
CPC . B29C 64/314; B29C 64/153; B29K 2075/00; B29K 2077/10; B29K 2105/0032; B29K 2105/251
USPC ........................................................ 524/495
See application file for complete search history.

(56) References Cited

U.S. PATENT DOCUMENTS

| | | | |
|---|---|---|---|
| 2018/0208762 A1* | 7/2018 | Pomestchenko | ........ B29C 71/02 |
| 2020/0148853 A1* | 5/2020 | Villacorta Hernandez | .................. C08K 7/06 |

* cited by examiner

*Primary Examiner* — Hannah J Pak

(57) ABSTRACT

The present invention provides a polymer composite particle material for three-dimensional printing. The polymer composite particle material is formed by embedding a carbon powder on a surface of a polymer powder. When the carbon powder is mixed with the polymer powder, a device with a shear force is used for stirring. Heating is performed during the stirring, such that melting occurs at the surface of the polymer powder. The carbon powder is embedded on the surface of the polymer powder to form a shell-core structure powder, and at the same time, the carbon powder is uniformly coated. The preparation method is simple and no additional dispersant and binder are needed. Besides the carbon powder will not easily separate from the polymer powder. At the same time, the agglomerated carbon powder can be dispersed by rubbing and evenly dispersed around the polymer powder to reduce a laser reflectivity.

8 Claims, 21 Drawing Sheets

PREPARATION METHOD FOR POLYMER COMPOSITE PARTICLE MATERIAL, AND THREE-DIMENSIONAL PRINTING METHOD BY USING POLYMER COMPOSITE PARTICLE MATERIAL

CROSS-REFERENCE TO RELATED APPLICATION

The present application claims priority from Taiwanese Patent Application No. 112106195 filed on Feb. 21, 2023, the contents of which are incorporated herein by reference in their entirety.

FIELD OF TECHNOLOGY

The present invention relates to the technical field of three-dimensional printing, particularly to a preparation method for a polymer composite particle material and a method using the polymer composite particle material for three-dimensional printing.

BACKGROUND

A mainstream laser forming method of a polymer bed fusion (PBF) is selective laser sintering (SLS). There are two forms of the selective laser sintering. One is a semiconductor laser with a relatively low laser power generally of 5-10 W and a wavelength of 350-950 nm. The other is a $CO_2$ laser with a relatively high laser power generally of 20-120 W and a wavelength of 9.4-10.6 μm. A polymer powder material has a relatively high absorption rate of the wavelength range. A main reason for using the semiconductor laser as a main energy source in the SLS technology is that the used laser power is relatively low and a laser energy source also has a low cost. Carbon powder is generally added into a polymer powder material to increase an absorption rate of the laser energy, such that the polymer powder can be melted when the semiconductor laser is used.

When no carbon powder is added, the common polymer powder material is white powder and easily reflects the laser energy. At this time, the energy absorption rate given to the laser is extremely low, such that the polymer powder material using the semiconductor laser is generally gray black and the carbon powder is added to increase an absorption rate of the laser energy. Therefore, when the carbon powder is added to increase the absorption rate of the laser energy, uniformity of the absorption of the laser energy after the carbon powder is added to the polymer powder material must be considered. In order to achieve a better uniformity, wet powdering and dry powdering are common methods.

The wet powdering is as follows: putting a polymer powder and a carbon powder into a stirring container at the same time, and adding a solution, a binder, and a dispersant, wherein the carbon powder generally has a particle size of 300 nm or lower. The powder is too fine and easy to agglomerate, the dispersant disperses the powder in the solution, then the carbon powder is attached to a surface of the polymer powder by the binder, the solution is removed by vacuuming or heating in this step, and then sieving is performed to obtain a powder material of a shell-core structure of the desired polymer powder and carbon powder. The carbon powder obtained by the method is coated on the surface of the polymer powder extremely uniformly. But a manufacturing process is too complicated and the polymer has a characteristic of water absorption, and therefore, processes of adding the carbon powder and removing the solution are extremely complicated.

Furthermore, the dry powdering is quite simple and is as follows: placing a polymer powder and a carbon powder in a container together, stirring and mixing same, sieving the mixture, and filtering undersized and unadhered carbon powder. However, in the method, the carbon powder is not adhered on the surface of the polymer powder and the carbon powder and the polymer powder are simply mixed, and therefore the obtained polymer powder material has a relatively large and non-uniform laser reflectivity range.

SUMMARY

For this purpose, the inventors have intensively studied and found various possible solutions for solving the above-mentioned problems of the prior art and finally have developed a polymer composite particle material for three-dimensional printing. During a manufacturing process, dry powdering is used. When a carbon powder is mixed with a polymer powder, a device with a shear force is used for stirring. Heating is performed during the stirring, such that melting occurs at the surface of the polymer powder. The carbon powder is embedded on the surface of the polymer powder to form a shell-core structure powder, and at the same time, the carbon powder is uniformly coated. The preparation method is simple and no additional dispersant and binder are needed. Besides the carbon powder will not easily separate from the polymer powder. At the same time, the agglomerated carbon powder can be dispersed by rubbing and evenly dispersed around the polymer powder to reduce a laser reflectivity range to be within 0.1%. At this time, the powder material with a shell-core structure can uniformly absorb a laser energy, such that a product has a uniform mechanical strength and an improved mechanical strength.

Specifically, the present invention provides a preparation method for a polymer composite particle material for three-dimensional printing. The polymer composite particle material is obtained by mixing a polymer powder and a carbon powder and performing a mixing procedure under a specific condition, wherein during the mixing procedure, melting occurs at a surface of the polymer powder, such that the carbon powder is attached to the surface of the polymer powder.

In other words, the present invention can provide a preparation method for a polymer composite particle material, wherein the polymer composite particle material can be used as a material for three-dimensional printing and improve mechanical properties (such as density, hardness, and tensile strength) of a three-dimensional printed finished product. The preparation method comprises the following steps: a first heating step: putting a polymer powder and a carbon powder into a mixing mill, and performing mixing for a first time under a condition that a cavity temperature of the mixing mill is a first temperature; a second heating step: raising the cavity temperature of the mixing mill from the first temperature to a second temperature at a speed of 1-10° C./min, and maintaining the second temperature for a second time; and a third heating step: raising the cavity temperature of the mixing mill from the second temperature to a third temperature at a speed of 0.1-5° C./min, and maintaining the third temperature for a third time to obtain the polymer composite particle material for three-dimensional printing.

According to the examples of the present invention, when the first temperature, the second temperature, and the third temperature are set to be T1, T2, and T3 respectively, and a melting point of the polymer powder is set to be Tm, T1, T2, T3, and Tm satisfy the following relational expressions:

$$1/4T1 \le T1 \le 3/4T1;$$
$$0 \le Tm - T2 \le 20; \text{ and}$$
$$5 \le T3 - T2 \le 30.$$

According to the examples of the present invention, when the first time, the second time, and the third time are set to be X1, X2, and X3 respectively, X1, X2, and X3 satisfy the following relational expressions:

$$30 \text{ min} \le X1 + X2 + X3 \le 200 \text{ min, and}$$
$$X1, X2, \text{ and } X3 \text{ are all not zero.}$$

According to the examples of the present invention, the first heating step further comprises raising the cavity temperature from room temperature to the first temperature at a speed of 1-10° C./min.

According to the examples of the present invention, when a rotation speed in the first heating step is set to be S1, a rotation speed in the second heating step is set to be S2, and a rotation speed in the third heating step is set to be S3, S1, S2, and S3 satisfy the following relational expressions:

$$S1 > S2 > S3.$$

According to the examples of the present invention, a weight ratio of the polymer powder to the carbon powder is between 98:2 and 99.9:0.1.

According to the examples of the present invention, the polymer powder has D50 of 40-60 micrometers and D90 of 90-110 micrometers.

According to the examples of the present invention, the carbon powder has an average particle size of 500 nm or below.

According to the examples of the present invention, after the third heating step, the method further comprises sieving the polymer composite particle material according to a desired particle size.

According to the examples of the present invention, the polymer powder is selected from at least one of polyamide-6 (PA-6), polyamide-66 (PA-66), polyamide-610 (PA-610), polyamide-1010 (PA-1010), polyamide-11 (PA-11), polyamide-12 (PA-12), polyamide-9 (PA-9), polyamide-612 (PA-612), polyamide-121 (PA-121), polyphthalamide (PPA), poly(p-phenylene terephthalamide) (PPTA), and thermoplastic polyurethane.

According to the examples of the present invention, the polymer composite particle material has a laser reflectivity of 0.5 time or less of that of the polymer powder.

In addition, the present invention may further provide a three-dimensional printing method. The method comprises the following steps: obtaining a polymer composite particle material by using the above-mentioned preparation method; laying the polymer composite particle material to form a powder layer, preheating the powder layer, and selectively irradiating the powder layer by scanning with a laser beam to melt and coalesce an irradiated region; cooling and solidifying the region to form a thin layer, which is a part of a three-dimensional printed finished product; and repeating steps b and c for stacking layer by layer until the three-dimensional printed finished product is obtained.

DESCRIPTION OF THE EMBODIMENTS

Figure 1A:
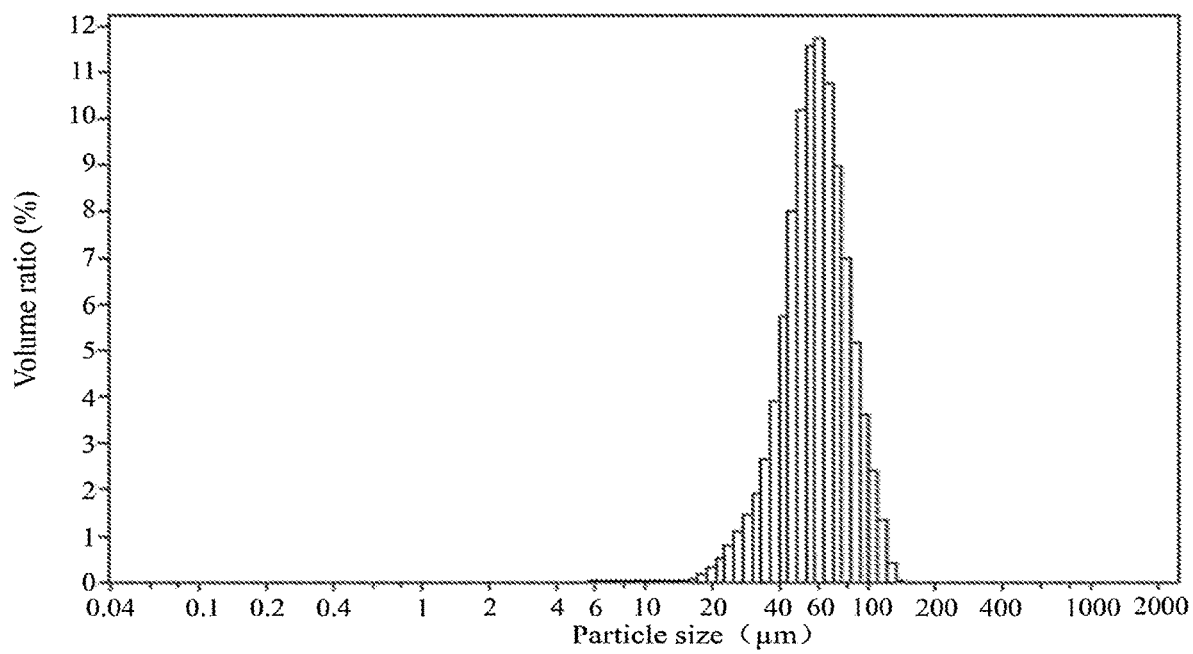
FIGS. 1A and 1B show particle size distributions of a composite particle material N2 and a composite particle material C2 in example 1 respectively.

In order to enable the objective, technical features, and advantages of the present invention to be more understood by a person skilled in the art to implement the present invention, the present invention is further illustrated by accompanying the appended drawings, specifically clarifying technical features and embodiments of the present invention, and enumerating better examples. In order to express the meaning related to the features of the present invention, the corresponding drawings herein below are not and do not need to be completely drawn according to the actual situation.

Herein, the singular forms "a", "an", and "the" are intended to include plural forms, unless the context clearly indicates other situations. It will be further understood that the terms "comprises" and/or "includes" when used in this description, specify the presence of stated features, components, and/or elements, but do not preclude the presence or addition of one or more other features, components, and/or elements, which should be explained clearly in advance. In addition, in the following detailed description of each example in conjunction with the drawings, the directional terms used in the following examples, such as "up", "down", "left", "right", "front", "back", etc. can be clearly presented, which are merely used with reference to directions shown in the attached drawings. Accordingly, the used directional terms are used to illustrate, but not to limit the present invention.

Furthermore, it is also clear to a person skilled in the art that: the illustrated examples and attached drawings are only provided for reference and illustration, but are not intended to limit the present invention; and modifications or variations which can be easily made based on the above description to complete an invention, are considered to be not departing from the spirit and scope of the present invention. Of course, the invention is also included in the claims of the present invention.

Firstly, the present invention provides a preparation method for a polymer composite particle material for three-dimensional printing. The polymer composite particle material is obtained by mixing a polymer powder and a carbon powder and performing a mixing procedure under a specific condition, wherein during the mixing procedure, melting occurs at a surface of the polymer powder, such that the carbon powder is attached to the surface of the polymer powder.

Specifically, the mixing procedure comprises the following steps:

a first heating step: mixing putting a polymer powder and a carbon powder into a mixing mill, and performing mixing for a first time under a condition that a cavity temperature of the mixing mill is a first temperature;

a second heating step: raising the cavity temperature of the mixing mill from the first temperature to a second temperature at a speed of 1-10° C./min, and maintaining the second temperature for a second time; and a third heating step: raising the cavity temperature of the mixing mill from the second temperature to a third temperature at a speed of 0.1-5° C./min, and maintaining the third temperature for a third time to obtain the polymer composite particle material for three-dimensional printing.

The first temperature, the second temperature, and the third temperature are generally set referring to a melting point of the polymer powder, for example, when the first temperature, the second temperature, and the third temperature are set to be T1, T2, and T3, respectively, and a melting point of the polymer powder is set to be Tm, T1, T2, T3, and Tm satisfy the following relational expressions:

$$1/4 T1 \le T1 \le 3/4 T1;$$

$$0 \le Tm - T2 \le 20; \text{ and}$$

$$5 \le T3 - T2 \le 30.$$

When the melting point of the polymer powder is 100° C. or below, the first temperature may be generally directly set to be room temperature. When the melting point of the polymer powder is larger than 100° C., the first heating step may further comprise raising the cavity temperature from room temperature to the first temperature at a speed of 1-10° C./min.

Besides, when the first time, the second time, and the third time are set to be X1, X2, and X3, respectively, X1, X2, and X3 satisfy the following relational expressions:

$$30 \text{ min} \le X1 + X2 + X3 \le 200 \text{ min, and}$$

$$X1, X2, \text{ and } X3 \text{ are all not zero.}$$

According to the technical idea of the present invention, when a rotor gradually increases a rotation speed, a mechanical force and a friction between powders can be increased, such that a surface of the powder material is softened and uniformly dispersed carbon black is coated on the surface of the polymer powder. Therefore, when the rotation speed in the first heating step is set to be S1, the rotation speed in the second heating step is set to be S2, and the rotation speed in the third heating step is set to be S3, S1, S2, and S3 satisfy the following relational expressions:

$$S1 > S2 > S3.$$

Preferably, S1, S2, and S3 satisfy the following relational expressions:

$$1 \text{ rpm} \le S1 \le 10 \text{ rpm};$$

-continued 5 rpm ≤ S2 ≤ 20 rpm; and 25 rpm ≤ S3 ≤ 50 rpm.

According to the technical idea of the present invention, the polymer powder has D50 of 40-60 micrometers and D90 of 90-110 micrometers. Besides, the carbon powder has an average particle size of 500 nm or below.

The polymer powder is generally selected from at least one of polyamide-6 (PA-6), polyamide-66 (PA-66), polyamide-610 (PA-610), polyamide-1010 (PA-1010), polyamide-11 (PA-11), polyamide-12 (PA-12), polyamide-9 (PA-9), polyamide-612 (PA-612), polyamide-121 (PA-121), polyphthalamide (PPA), poly(p-phenylene terephthalamide) (PPTA), and thermoplastic polyurethane (TPU), preferably selected from polyamide-66 (PA-66), polyamide-11 (PA-11), polyamide-12 (PA-12), polyamide-9 (PA-9), polyamide-612 (PA-612), polyamide-121 (PA-121), polyphthalamide (PPA), poly(p-phenylene terephthalamide) (PPTA), and thermoplastic polyurethane (TPU), more preferably selected from polyamide-66 (PA-66), polyamide-12 (PA-12), polyamide-121 (PA-121), polyphthalamide (PPA), poly(p-phenylene terephthalamide) (PPTA), and thermoplastic polyurethane (TPU), and most preferably selected from polyamide-12 (PA-12) or thermoplastic polyurethane (TPU).

In addition, a weight ratio of the polymer powder to the carbon powder is generally between 98:2 and 99.9:0.1, preferably between 98.5:1.5 and 99.9:0.1, more preferably between 99:1 and 99.9:0.1, and most preferably between 99.5:0.5 and 99.9:0.1. An addition of excessive carbon black may affect a binding property of a sintered finished product, further reduces mechanical properties, and even causes over-sintering. Nano-grade powder is easy to generate adsorption agglomeration due to an electrostatic force, such that the polymer composite particle material of the present invention is prepared by mixing using a mixing mill.

Besides, in the examples of the present invention, a polymer powder and a carbon powder are put into an open-close type mixing mill for mixing, a "∞" shape in a mixing cavity is conducive to material dispersion and mixing, a rotor is respectively arranged left and right, rotates relatively clockwise and counterclockwise while stirring, and the left and right rotors can generate mechanical shearing and a friction action of the powder when rotating. Therefore, agglomerated nano carbon black powder added during the mixing is beneficial to dispersing in the mixing cavity, and the powder is stirred and mixed in the cavity and heated by an electric heating rod arranged in a lower part of the cavity. A temperature is controlled by sensing a sharp edge of a center of the cavity and the temperature close to a material center may be sensed at this position.

After the mixing procedure is completed, the powder with a desired particle size range may be sieved by a sieving machine. The powder is the polymer composite particle material for three-dimensional printing. A laser reflectivity of the polymer composite particle material is greatly reduced compared to an original polymer powder. Specifically, the laser reflectivity of the polymer composite particle material is 0.5 time or less, preferably 0.4 time or less, and more preferably 0.3 time or less.

No additional dispersant and binder are needed to be added into the polymer composite particle material for three-dimensional printing prepared by the method. Besides, the carbon powder will not easily separate from the polymer powder. At the same time, the agglomerated carbon powder can be dispersed by rubbing and evenly dispersed around the polymer powder to reduce a laser reflectivity range to be within 0.1%. When the three-dimensional printing is performed by selective laser sintering (SLS), a cost of an energy source may be reduced by using a semiconductor laser.

A selective laser sintering machine used in the examples of the present invention is an Sinterit Lisa 3D printer, a 5 W near-infrared diode laser system at a wavelength of 808 nm. The Lisa printer mainly comprises a powder supply groove, a printing groove, a layer thickness control module, infrared ray (IR) heating lamps, and a laser source, wherein a printing area and a powder supply area on a powder bed mechanism are respectively provided with a corresponding preheating device, a powder material in the powder supply groove is firstly preheated to a certain temperature, then the powder is lifted and conveyed to the printing groove through a rolling shaft and two platforms, the printing groove can receive a semiconductor laser scanning, and the powder in a scanning area is melted, formed, and constructed layer by layer. A preheating device is divided into the preheating IR lamps of the powder supply groove and the printing groove. Besides, different preheating temperatures can be set to firstly preheat powder in the powder supply groove and reduce warping deformation caused by cooling when a semi-crystalline material or a crystalline material meets a new layer of powder at a lower temperature. Printing parameters such as different layer thicknesses, laser energy densities, preheating temperatures and the like may be controlled by using a layer-cutting software, Sinterit Studio, corresponding to the Lisa printer. Different parameters can be set according to used materials and models to adjust cut layers.

Then, the present invention is described below with reference to the specific examples.

Example 1

In the present example, a general process and a carbon black coating process are respectively used to obtain a composite particle material using PA12 as a polymer powder.

A main material used in the present example is PA12 powder of the EVONIK company and has the following physical properties: a density of 1.01 g/cm$^3$, a melting point of 187° C., a recrystallization temperature of 149.6° C., and an average particle size of 57 μm, and an appearance form of an irregular polygon. A particle size of a TPU powder is analyzed by a laser analyzer to determine that the TPU powder has an average particle size D50 of 58.43 μm and D90 of 88.60 km. A minimum set value of a layer thickness parameter of a printer should be more than 90 μm or more. Besides, in a laser sintering, in order to ensure that powder sintering occurs in a direct laser contact with particles, rather than relying on interparticle conduction, it is recommended that a layer thickness is at least twice the average particle size (D50). In the Lisa printer, an experimental device, a layer thickness may be set to be 75 μm, 100 μm, 125 μm, and 150 μm, such that a selection of the layer thickness of 125 μm closest to twice of the particle size D50 of PA12 is an experimental basis.

When the material PA12 of the experiment is used for a TGA measurement, a heating rate is set to be 10° C. per min and heating is performed from 25° C. to 800° C. It can be known from the results that the PA12 material has a relatively obvious weight loss from 350° C., a gradually decreased weight loss trend when the temperature is raised to 500° C., and a weight approximately to 0 when the temperature is raised to 800° C. The PA12 material is in a molten state after a melting point of 187° C., subjected to cracking, gasification and other phase transformations from the melting point temperature to 350° C. measured by TGA. It can be known that a maximum measured temperature may be set to be less than or equal to 350° C. when a DSC experiment is subsequently performed. A temperature value desired by the material during melting may be measured before the temperature. The DSC analysis shows that a heat change of PA12 during DSC heating and a measured heating rate is set to be 10° C. per min. Besides, a TGA measurement result shows that a maximum test temperature may be less than or equal to 350° C. The temperature is known to be greater than a melting end temperature when at 200° C., such that the temperature is maintained for 10 min after a maximum heating temperature of the DSC measurement is set to be 200° C. It can be known from a measured heating heat generation temperature point that the PA12 material starts to generate a melting reaction from an initial value of 181.45° C. to a peak temperature of 187.23° C. and then to the melting end temperature of 189.42° C., and a whole melting heat change process is completed. In addition, in order to reduce a laser reflectivity, the pure PA12 powder should be mixed with carbon black. The carbon black used in the example has the following physical properties: a density of 1.7-1.9 g/cm3, a primary particle size of 0.28 μm, and a melting point of more than 3,000° C.

From an analysis result of a spectrometer, it can be seen that if a sintering printing is performed by using an infrared laser with a wavelength of 808 nm, the reflectivities of the PA12 powder and the carbon black material under the wavelength are 69.91% and 7.56%, respectively. Therefore, different ratios of the carbon black can be added into the PA12 powder to reduce reflection of the PA12, such that the PA12 powder may be sintered under a short wavelength laser.

Specific operation methods of the general process and the carbon black coating process are as follows:

General Process:

Carbon black and PA12 are put into a mixing mill according to ratios shown in Table 1, and uniformly mixed at a rotation speed of 30 rpm at room temperature. The mixing is continuously performed until the composite powder has a uniform color and no obvious color difference. Then the composite powder is classified by an LS-300T vibration sieve to a desired particle size range to obtain composite particle materials N1 to N3. It is selected by a sieve that 140-mesh corresponds to a size of 109 μm, agglomerated particles are separated, and a subsequent forming experiment is performed by using powder with a particle size meeting an SLS technology.

Carbon Black Coating Process (the Present Invention):

Carbon black and PA12 are put into a mixing mill according to ratios shown in Table 1. A cavity temperature is raised from room temperature to a first temperature (100° C.) at a speed of 2.5° C./min, the first temperature is maintained for a first time (15 min) to remove residual moisture from the PA12 powder, and at this stage, a rotation speed S1 is 5 rpm.

Then the cavity temperature is raised to a second temperature (170° C.) at a speed of 4.67° C./min, the second temperature is maintained for a second time (5 min), and at this stage, a rotation speed S2 is 10 rpm.

Then the cavity temperature is raised to a third temperature (175° C.) at a speed of 1° C./min, the third temperature is maintained for a third time (10 min) to ensure that a temperature of the powder in the cavity all reaches the temperature of the carbon black coating stage, and at this stage, a rotation speed S3 is 40 rpm. An improvement of the rotation speed can increase a mechanical force and a friction between powders, such that a surface of the powder material is softened and the uniformly dispersed carbon black is coated on the surface of the PA12 powder. Then the powder is classified by an LS-300T vibration sieve to a desired particle size range to obtain composite particle materials C1 to C3. It is selected by a sieve that 140-mesh corresponds to a size of 109 μm, agglomerated particles are separated, and a subsequent forming experiment is performed by using the powder with a particle size meeting an SLS technology. The powder obtained by using a sieving machine has an average weight of 804 g, the original PA12 powder has a weight of 850 g, and an average yield is 94.7%.

TABLE 1

|  | General process ||| Carbon black coating process |||
|---|---|---|---|---|---|---|
|  | Composite particle material ||||||
|  | N1 | N2 | N3 | C1 | C2 | C3 |
| PA12 (wt %) | 99.8 | 99.75 | 99.7 | 99.8 | 99.75 | 99.7 |
| Carbon black (wt %) | 0.2 | 0.25 | 0.3 | 0.2 | 0.25 | 0.3 |

Generally, the pure PA12 powder has a relatively high reflectivity, cannot be printed to be formed in an original powder state in a Lisa SLS 3D printer, and can be printed to be formed by mixing the carbon black to reduce the reflectivity of the material.

In addition, compared with the reflectivity and a carbon separation phenomenon of commercial PA12 powder of the Sinterit Company, composite particle material N2, and composite particle material C1, the reflectivity of the commercial PA12 powder is 25.76%, but a carbon powder separation phenomenon will occur after ultrasonic oscillation for 10 min.

However, the carbon black coating process can uniformly coat the carbon black on the surface of the PA12 powder and no carbon powder separation phenomenon occurs. The reflectivity of the composite particle material C1 is 25.21%, which is lower than that of the commercial PA12 powder, while the reflectivity of the composite particle material N2 of the general process is 25.54%, which shows that the composite particle material C1 subjected to the carbon black coating process can achieve a better reflectivity by using a smaller carbon black ratio than the composite particle material N2 of the general process.

1. Particle Size Analysis

Figure 1B:
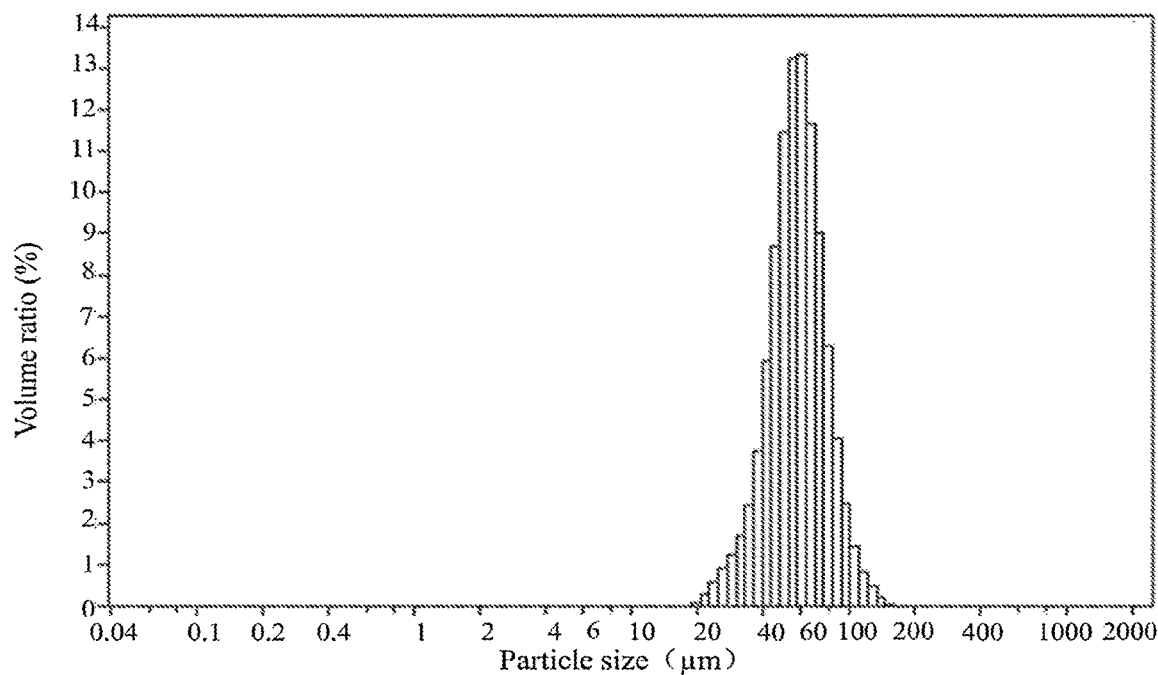

As shown in FIGS. 1A and 1B, particle sizes and distributions of the composite particle material N2 and the composite particle material C2 are measured by using a Coulter LS230 laser particle size analyzer. The composite particle material N2 has a particle size distribution D10 of 36.93 μm, D50 of 58.43 μm, and D90 of 88.60 μm. The composite particle material C2 has a particle size distribution D10 of 38.88 μm, D50 of 57.68 μm, and D90 of 87.26 μm. Therefore, it can be seen that there is no significant difference in the particle size and particle size distribution of the composite particle materials prepared by the two processes.

2. Thermogravimetric Loss Analysis

Figure 2:
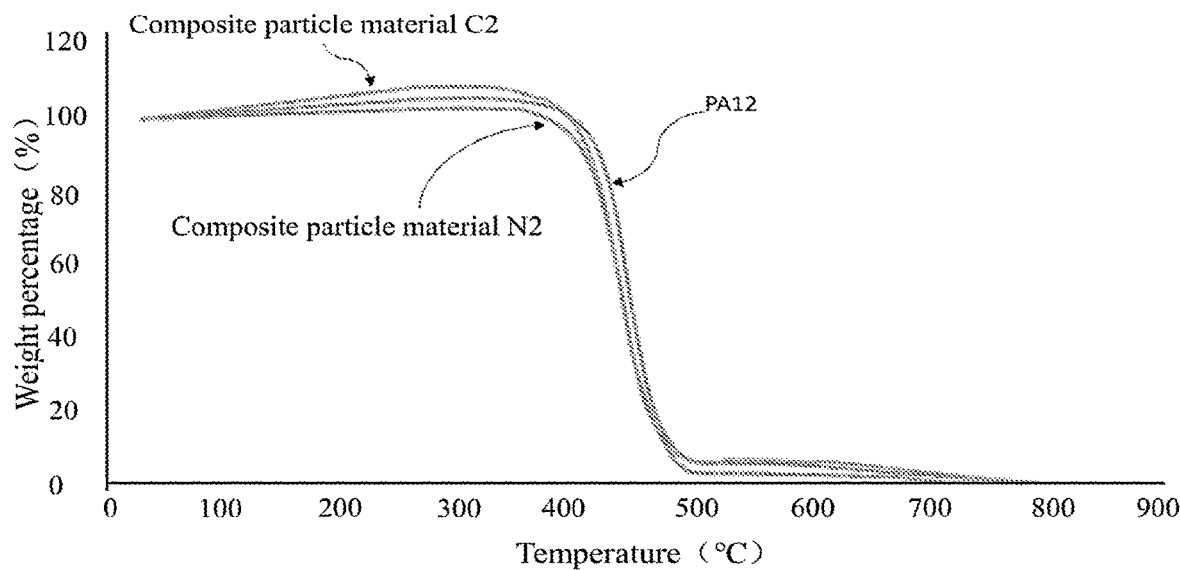
FIG. 2 shows a thermogravimetric analysis (TGA) of 100% PA12, the composite particle material N2, and the composite particle material C2 in example 1.

The results of the 100% PA12, the composite particle material N2, and the composite particle material C2 measured using a thermogravimetric loss analyzer (TGA) were shown in FIG. 2. It can be known from FIG. 2 that the three materials are cracked after heated from 25° C. to 350° C. in a nitrogen environment to lose weight and have an obvious weight loss from 350° C. to 500° C. When the temperature reaches 800° C., the weight of the three materials is close to zero. It can be known from the test result that the carbon black is added to the pure PA12 powder or the carbon black coating process does not affect a thermogravimetric loss.

3. Differential Scanning Calorimetry Analysis

Changes produced after heating are analyzed for the carbon black powder, PA12, composite particle material N2, and composite particle material C2 used in the present invention using a differential scanning calorimetry (DSC) at a heating rate of 10° C. per min from 25° C. to 200° C.

Figure 3A:
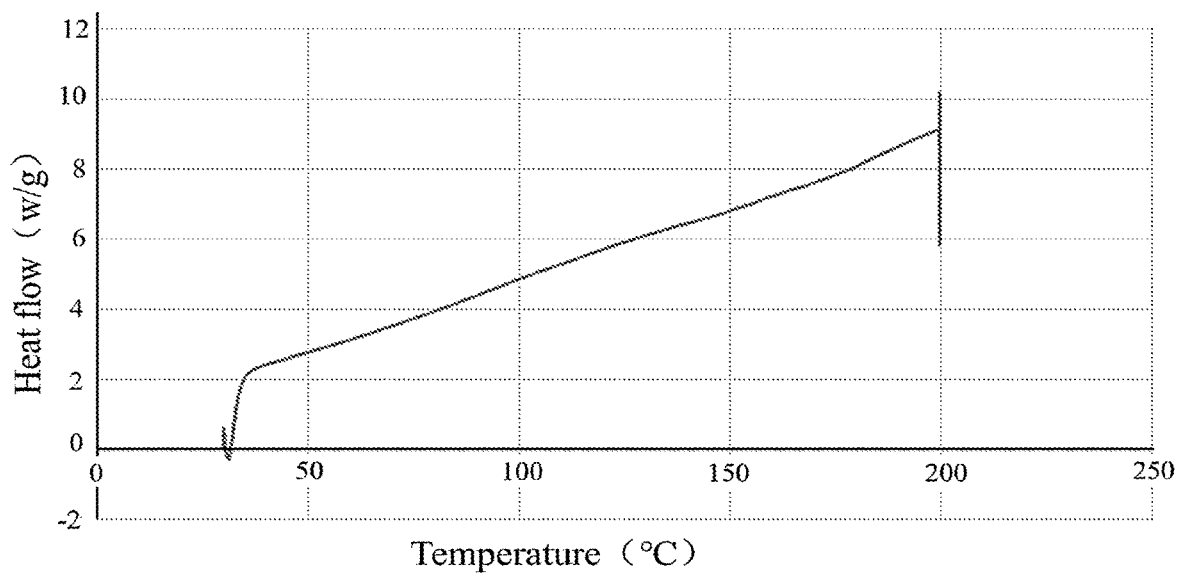
FIGS. 3A and 3B show differential scanning calorimetry (DSC) of carbon black, and the PA12, the composite particle material N2, and the composite particle material C2 in example 1 respectively.
Figure 3B:
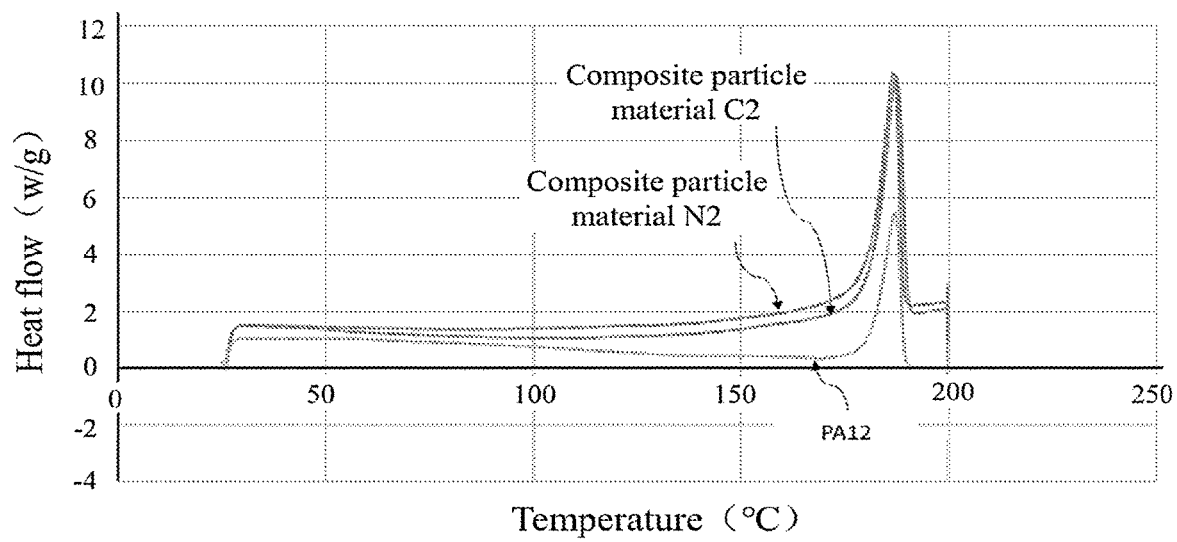

It can be seen from FIG. 3A that during a measurement process, the carbon black has no obvious peak value. It is determined that the carbon black will not change at a temperature before 200° C. FIG. 3B shows that a trend of a DSC test result of an addition of the carbon black into the PA12 powder is the same as that of the carbon black coating process. Heat flow changes of each melting temperature value (as shown in Table 2) are similar and have no obvious difference. It is known that the composite powder of the carbon black and the PA12 has the same melting thermal properties as the original powder during the heating.

TABLE 2

| Material | Temperature point | Temperature |
|---|---|---|
| Composite particle material N2 | Initial melting value | 180.98° C. |
| | Melting peak value | 186.79° C. |
| | Melting end value | 189.17° C. |
| Composite particle material C2 | Initial melting value | 181.37° C. |
| | Melting peak value | 187.44° C. |
| | Melting end value | 190.19° C. |

4. Infrared Spectrum Analysis

To ensure that no chemical reaction occurs between the carbon black and the PA12 during the process, changes in functional groups of the PA12 powder, the composite particle material N2, and composite particle material C2 are detected using a Fourier infrared spectrometer.

Figure 4:
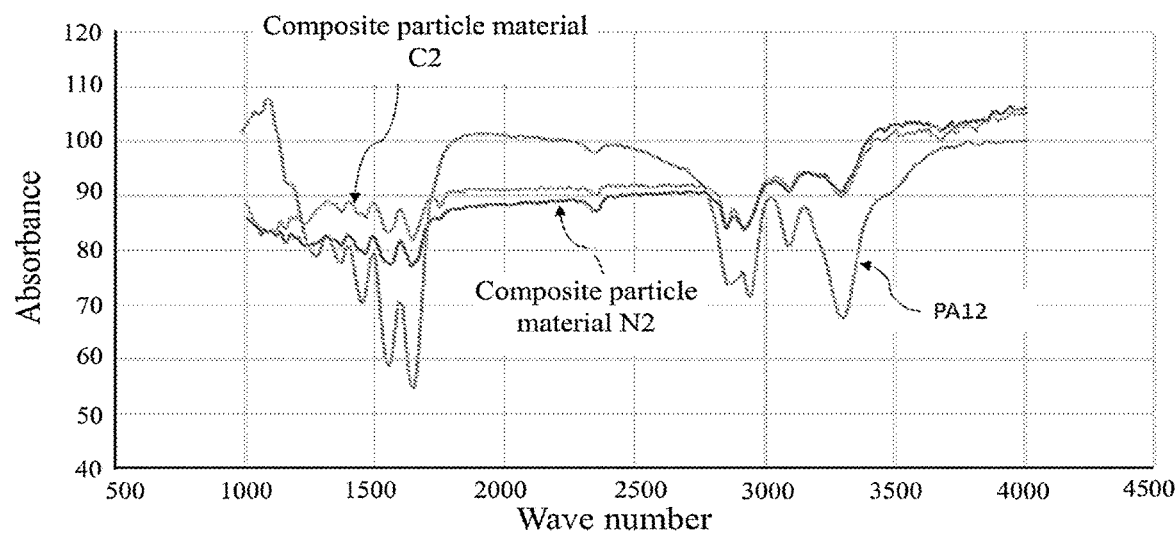
FIG. 4 shows an infrared spectrum of the PA12 powder, the composite particle material N2, and the composite particle material C2 in example 1.

It can be seen from FIG. 4 that reactions of the functional groups of the three materials of the wave number of 1,400-1,800 and the wave number of 2,800-3,400, are the same and have no obvious difference. It can be known that the carbon black does not affect the functional groups of the PA12 material. It can be determined that a mixing method of the carbon black coating process enables the powder to generate a physical change, not a chemical change.

5. Preheating Temperature Analysis

According to thermal properties of the PA12 composite powder measured by the DSC, it was known that the PA12 composite powder has an initial melting value of 181° C. A preheating temperature could not exceed the initial melting value when the Lisa SLS printer is used. The material is heated to be molten after being scanned by the laser system, reaches the melting temperature, and is then cooled to the preheating temperature set by the machine. The material is contacted with a new layer of powder in the cooling process to accelerate the cooling of the molten powder. At this time, the setting of the preheating temperature affects a temperature field of the printer and is very important for a temperature change of the material after being molten and cooled.

The PA12 material generates a warping phenomenon in the cooling process after melting. The cooling enables the temperature change to affect a warping height in the printing process. If the height exceeds a printing layer thickness, a warped printing piece is pushed by a rolling shaft actuated by a powder spreading mechanism to cause a displacement, and thus the printing piece cannot be printed and formed. Since the initial melting value to the end value is in a range of 10° C., the preheating temperature is set to be 171° C., obtained by reducing 181° C. by 10° C., as a basis for a preheating experiment.

The results obtained above are divided into 5 preheating temperatures and 3 laser energy densities (as shown in Table 3) to perform a pilot forming experiment on homemade composite powder N-PA12 0.25, the layer thickness is set to be 125 μm according to the set value of the PA12 powder of the Sinterit Lisa original factory, printing models are tensile test pieces (see ASTM D638), and a total of 15 groups of parameters are set. Forming conditions of the different parameters are compared.

TABLE 3

| Parameter code | Preheating temperature (° C.) | Energy density (J/mm$^2$) | Layer thickness (μm) |
|---|---|---|---|
| A | 169 | 0.0110 | 125 |
| B | | 0.0187 | |
| C | | 0.0283 | |
| D | 171 | 0.0110 | 125 |
| E | | 0.0187 | |
| F | | 0.0283 | |
| G | 173 | 0.0110 | 125 |
| H | | 0.0187 | |
| I | | 0.0283 | |
| J | 175 | 0.0110 | 125 |
| K | | 0.0187 | |
| L | | 0.0283 | |
| M | 177 | 0.0110 | 125 |
| N | | 0.0187 | |
| O | | 0.0283 | |

15 groups of the printing parameters of A-O are obtained from Table 4.7. Unsuccessful printing of the PA12 material is determined as the following three points:
 (I) The preheating temperature is too low to warp the printed test piece which cannot be formed.
 (II) The preheating temperature is too high, such that a powder part area in a printing area is melt and agglomerated.
 (III) The high laser energy density enables the powder around the printing piece to be melt and agglomerated to affect the forming.

In a printing forming experiment, the printing parameters of groups A, B, and C will generate a larger warping in each layer of printing in the printing. When the warping is higher than a set layer thickness, the powder in a powder supply groove is pushed to a printing groove by a back-and-forth movement of a powder applying rolling shaft of the SLS printer, a warped test piece higher than an original powder laying height is pushed to leave an original printing position, and therefore each layer is deformed to cause a final tensile test piece to be separated in a multilayer sheet shape. The parameters of groups E and F with higher energy densities of 0.019 J/mm$^2$ and 0.0283 J/mm$^2$, have a higher melting temperature than the group with an energy density of 0.011

J/mm². But the energy densities of the two groups warp the printed test piece at the preheating temperature of 171° C. and thus the test piece cannot be printed to be formed. The printing energy density of group 1 corresponds to the preheating temperature of 173° C., such that the printed test piece is warped and cannot be formed. Groups D and G both belong to a conventional printing and forming. Warping deformation, incapability of removing the powder adhered around the test piece, and the like do not occur.

The preheating temperature of groups J, K, and L is 175° C., which enable the powder part area to melt and agglomerate. A melting phenomenon occurs at an area of a left side. The powder around the printed test piece is melted and cannot be removed after cooling, such that the PA12 material is classified as the preheating temperature of non-printing setting at 175° C. The preheating temperature is set to be 177° C. as a parameter of groups M, N, and O. This temperature will enable a large area of powder to agglomerate in a left half area of the printing groove, such that the printed test piece cannot be removed from the agglomerated area.

6. Comparison of Surface Uniformity

Figure 5A:
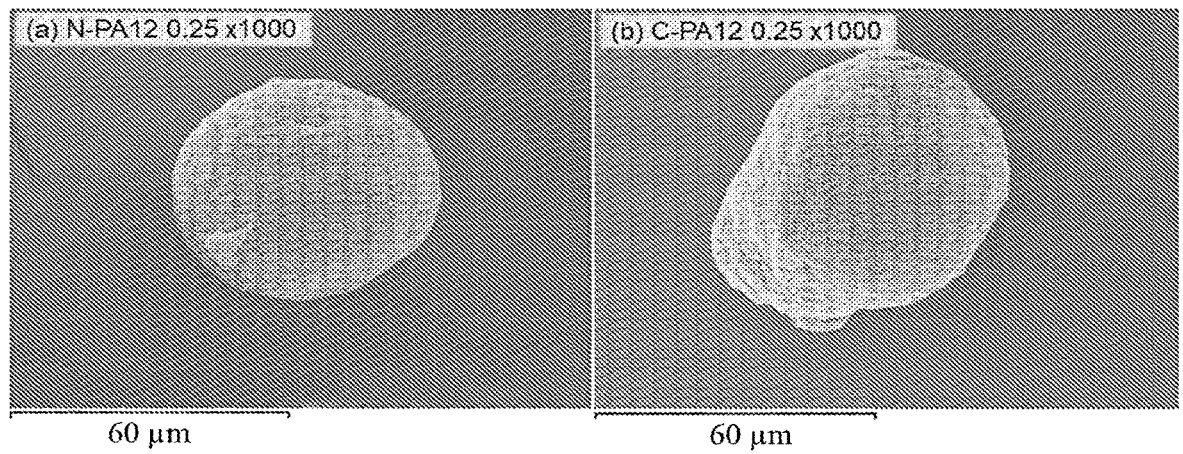
FIGS. 5A and 5B show a scanning electron microscope (SEM) mapping of the composite particle material N2($a$) and the composite particle material C2($b$) in example 1 at a magnification of 1,000×, and an SEM mapping of the composite particle material N2($a$) and the composite particle material C2($b$) at a magnification of 3,000× respectively.
Figure 5B:
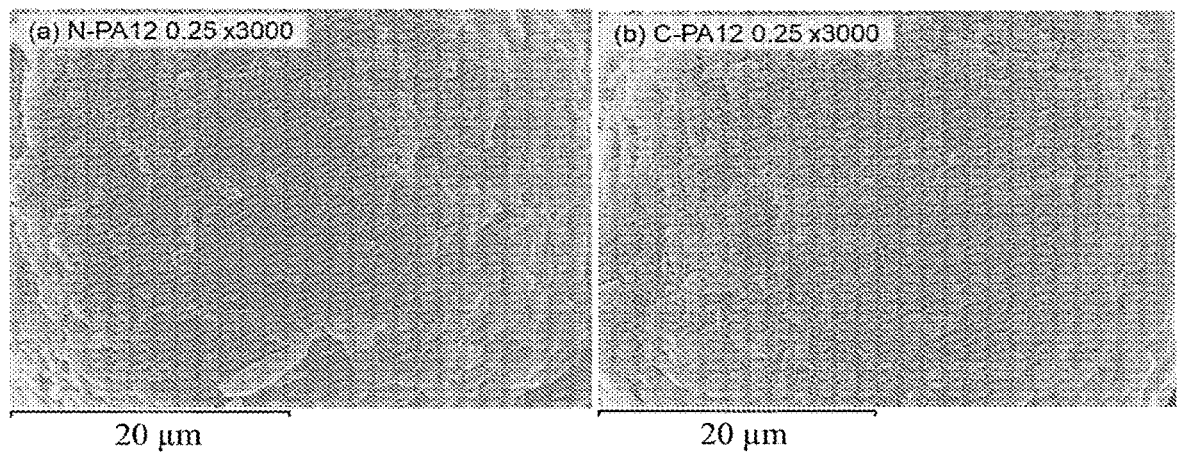

A high-resolution field emission electron microscope JEOL 6500F is used to perform SEM mapping by using an energy dispersive spectrometer (EDS). The distribution of the carbon black dispersed on both the composite particle material N2 and the composite particle material C2 on a surface of powder is observed. FIG. 5A respectively shows an SEM mapping of the composite particle material N2(*a*) and the composite particle material C2(*b*) at a magnification of 1,000×. It can be observed that the carbon black of the composite particle material C2 coated by the carbon black of the present invention is uniformly and stably coated on a powder surface. Furthermore, FIG. 5B respectively shows an SEM mapping of the composite particle material N2(*a*) and the composite particle material C2(*b*) at a magnification of 3,000×. After the magnification is increased to 3,000 times, it can be more clearly observed that the carbon black is more densely and uniformly distributed on the surface of the composite particle material C2, but sparsely distributed on the surface of the composite particle material N2. The reason why the reflectivity of the powder prepared by the thermal carbon black coating process is reduced can be known from an observation by the SEM mapping.

In addition, the characterization of the composite particle material N2 is observed. It is found that an obvious scaly shape is shown on the powder surface. However, the scaly surface of the composite particle material C2 prepared by the carbon black coating process of the present invention is reduced and smooth. It can be known from this that melting occurs at the surface when the carbon black is coated on PA1 during mixing and heating. This melting state can enable the carbon black to be effectively coated on the surface of the PA12 powder.

7. Tensile Strength Comparison

A tensile strength of the test piece after the three-dimensional printing of the composite particle material N2 and the composite particle material C2 is measured using a universal tester. Printing conditions and analysis results are shown in Table 3.

TABLE 3

| | Material | Composite particle material N2 | Composite particle material C2 |
|---|---|---|---|
| Printing condition | Preheating temperature (° C.) | 173 | |
| | Energy density (J/mm²) | 0.0110 | |
| | Spreading layer thickness (μm) | 125 | |
| Analysis result | Density of test piece | 0.736 | 0.778 |
| | Tensile strength | 31.9 | 41.1 |

It can be known from the results of Table 3 that the composite particle material C2 obtained by the coating method of the present invention has a higher tensile strength than the composite particle material N2 of the general mixing method. Besides, the carbon black-coated PA12 composite powder has a lower light reflectivity at the same carbon black ratio, such that the laser reflection can be reduced and a mechanical strength can be improved by 28.8%.

8. Effects of Carbon Black Ratio and Laser Energy Density

The composite particle materials C1 to C3 with different carbon black ratios are subjected to three-dimensional printing at different laser energy densities (a spreading layer thickness is 125 μm). Effects on tensile strength, density, and hardness of the printed test pieces are compared. Printing sintering is observed by the SEM. Printing conditions and analysis results are shown in Table 4 (non-numerical values indicate that the test pieces cannot be formed).

TABLE 4

| | | Printing condition | | Physical properties of test piece | | |
|---|---|---|---|---|---|---|
| Groups | Composite particle material | Preheating temperature (° C.) | Energy density (J/mm²) | Density (g/cm²) | Hardness (Shore D) | Tensile strength (Mpa) |
| 1 | C1 | 171 | 0.0110 | 0.714 | 67.8 | 24.95 |
| 2 | C2 | 171 | 0.0110 | 0.698 | 65.1 | 21.45 |
| 3 | C3 | 171 | 0.0110 | 0.686 | 64.7 | 18.35 |
| 4 | C1 | 171 | 0.0123 | 0.736 | 69.8 | 31.90 |
| 5 | C2 | 171 | 0.0123 | — | — | — |
| 6 | C3 | 171 | 0.0123 | — | — | — |
| 7 | C1 | 173 | 0.0110 | 0.757 | 70.7 | 35.65 |
| 8 | C2 | 173 | 0.0110 | 0.778 | 70.9 | 39.95 |
| 9 | C3 | 173 | 0.0110 | 0.716 | 69.8 | 29.70 |
| 10 | C1 | 173 | 0.0123 | 0.830 | 72.5 | 45.45 |
| 11 | C2 | 173 | 0.0123 | 0.819 | 72.2 | 45.15 |
| 12 | C3 | 173 | 0.0123 | 0.798 | 71.3 | 42.35 |
| 13 | C1 | 173 | 0.0140 | 0.853 | 72.6 | 48.85 |
| 14 | C2 | 173 | 0.0140 | 0.877 | 72.5 | 46.25 |
| 15 | C3 | 173 | 0.0140 | — | — | — |
| 16 | C1 | 173 | 0.0157 | 0.959 | 73.0 | 55.55 |
| 17 | C2 | 173 | 0.0157 | — | — | — |
| 18 | C3 | 173 | 0.0157 | — | — | — |

The results of three groups (groups 10, 11, and 12) with a higher average mechanical strength, a preheating temperature of 173° C., and an energy density of 0.0123 J/mm² at different carbon black ratios are compared. It can be seen that when the carbon black ratio is 0.20 wt %, the obtained composite particle material C1 has a highest mechanical strength, a tensile strength of 45.45 MPa, a density of 0.830 g/cm², and a Shore hardness of 72.51D.

Figure 6:
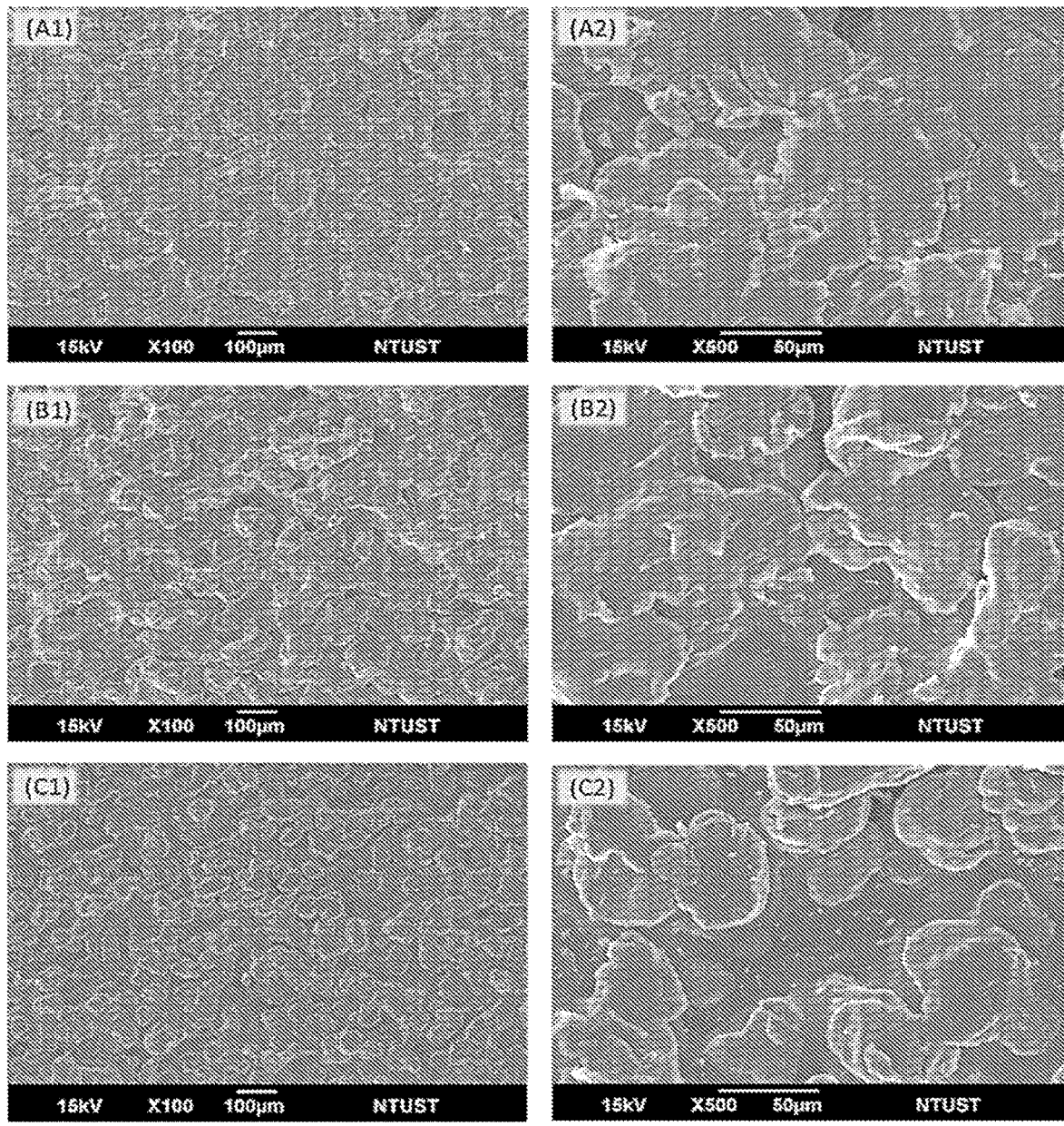
FIG. 6 shows SEM figures of test pieces obtained in groups 10, 11, and 12 in example 1.
Figure 7:
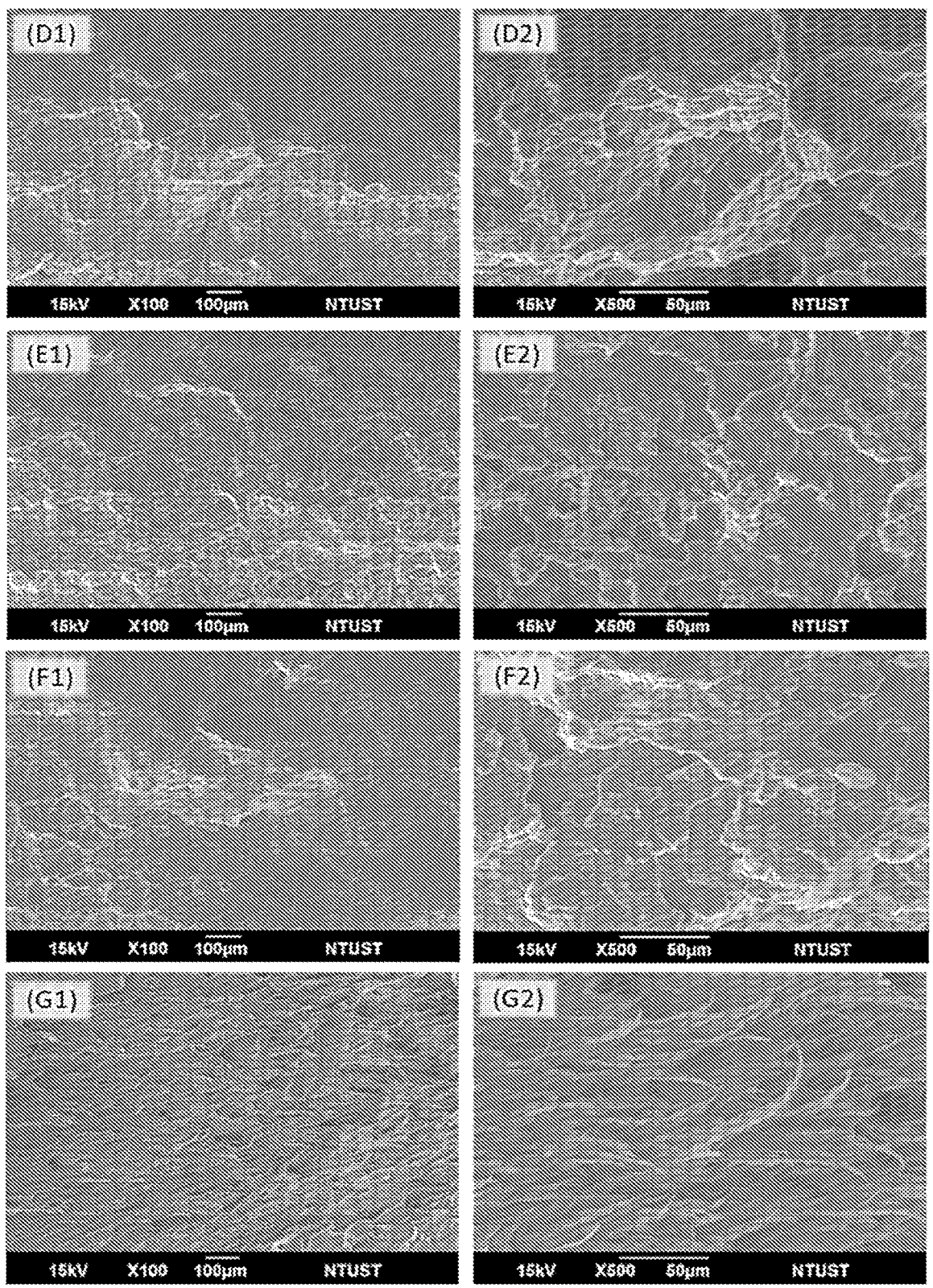
FIG. 7 shows SEM figures of horizontal cross sections of test pieces, with a vertical force direction, obtained in groups 7, 10, 13, and 16 of example 1.

In addition, FIG. 6A to C show SEM figures of the test pieces obtained in groups 10, 11, and 12. It can be observed from FIGS. 6B and C that the surfaces of the printed test pieces are more granular and unsmooth. FIG. 6A shows that the surfaces of the printed test pieces are less granular and smoother.

Furthermore, when the test pieces are printed using the composite particle material C1 having a carbon black ratio of 0.2 wt % at a preheating temperature of 173° C., test values (groups 7, 10, 13, and 16) of different energy densities are compared. It can be known that group 16 at a preheating temperature of 173° C., a carbon black ratio of 0.2 wt %, and an energy density of 0.0157 J/mm$^2$ has a tensile strength of 55.55 MPa, a density of 0.959 g/cm$^2$, and a shore hardness of 73 D. In addition, compared with the test pieces under other formable energy densities, the test piece having a higher tensile strength shows a necking phenomenon. In addition, FIG. 7D to G respectively show SEM figures of horizontal cross sections of the test pieces, with a vertical force direction, obtained in groups 7, 10, 13, and 16. It can be observed from the figures that the cross sections of groups 7, 10, and 13 are relatively flat and have a part of flaky lifted areas. However, the test piece obtained from group 16 has a highest tensile strength, has a larger fluctuation and a filamentous lifted phenomenon in a cross section compared with the test piece with other pars by the section SEM image. According to the above results, the best mechanical property parameters are a preheating temperature of 173° C., a carbon black ratio of 0.2 wt %, and an energy density of 0.0157 J/mm$^2$ (group 16).

9. Effect of Printing Layer Thickness

A setting of a layer thickness parameter will affect an anisotropy, internal structure, and surface roughness of an SLS printing technology. Different layer thickness parameters affect sintering and even melting of material powder particles in the printing.

It can be known from the above that the composite particle material obtained by the method of the present invention has a tensile strength of 55.55 MPa at a carbon black ratio of 0.2 wt %, a preheating temperature of 173° C., and an energy density of 0.0157 J/mm$^2$. The test piece is printed at a layer thickness of 125 μm with above parameters. Therefore, an effect of different layer thicknesses on printing will be tested. The layer thicknesses will be compared with the original layer thickness of 125 μm, and is divided into three groups of parameters of 100 μm, 125 μm, and 150 μm. Specific printing conditions and physical property analysis results are shown in Table 5.

TABLE 5

| | Printing condition | | | Physical properties of test piece | | |
|---|---|---|---|---|---|---|
| Groups | Composite particle material | Preheating temperature (° C.) | Energy density (J/mm$^2$) | Printing layer thickness (μm) | Density (g/cm$^2$) | Hardness (Shore D) | Tensile strength (Mpa) |
| 19 | C1 | 173 | 0.0157 | 100 | 0.911 | 71.68 | 44.85 |
| 20 | C1 | 173 | 0.0157 | 125 | 0.959 | 73.04 | 55.55 |
| 21 | C1 | 173 | 0.0157 | 150 | 0.931 | 72.75 | 49.95 |

It can be known from the results in Table 5 that when the printing layer thickness of 100 μm is closest to a particle size D90 of 90 μm of the composite particle material, a tensile strength is 44.85 MPa, while when the printing layer thickness of 125 μm is closest to twice a particle size D50 of the composite particle material, a best tensile strength is 55.55 MPa.

10. Comparison with Commercially Available Product

A pore distribution of the test pieces is analyzed and printed by using a computed tomography scanner, a Bruker Skyscan1276. The test piece obtained by three-dimensional printing the composite particle material C1 with printing parameters of a preheating temperature of 173° C. and an energy density of 0.0157 J/mm$^2$, a test piece printed from Lisa commercial powder by using parameters set by an original factory, and a test piece multi-jet melt and formed by the HP company are compared. The pore distributions of the printed test pieces are analyzed.

TABLE 6

| Code | Material | Forming process | Reflectivity (%) | Tensile Strength (Mpa) |
|---|---|---|---|---|
| (a) | Composite particle material C1 | SLS | 25.21 | 55.55 |
| (b) | HP-PA12 | MJF | Original factory parameter | 49.84 |
| (c) | Lisa-PA12 | SLS | 25.76 | 48.92 |

Figure 8A:
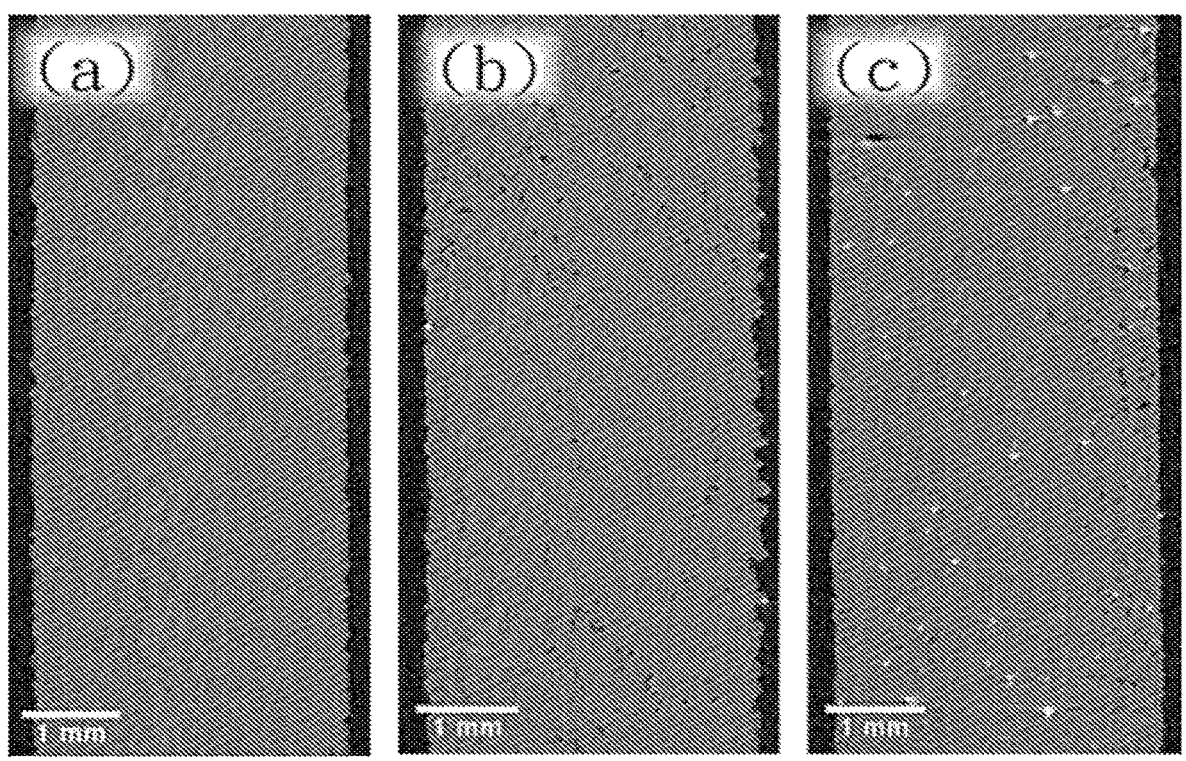
FIGS. 8A and 8B show a front CT scan and a side CT scan of a composite particle material C1 test piece (a), an MJF-PA12 test piece (B), and a Lisa-PA12 printed test piece (C) respectively in a comparison analysis with a commercially available product in example 1.
Figure 8B:
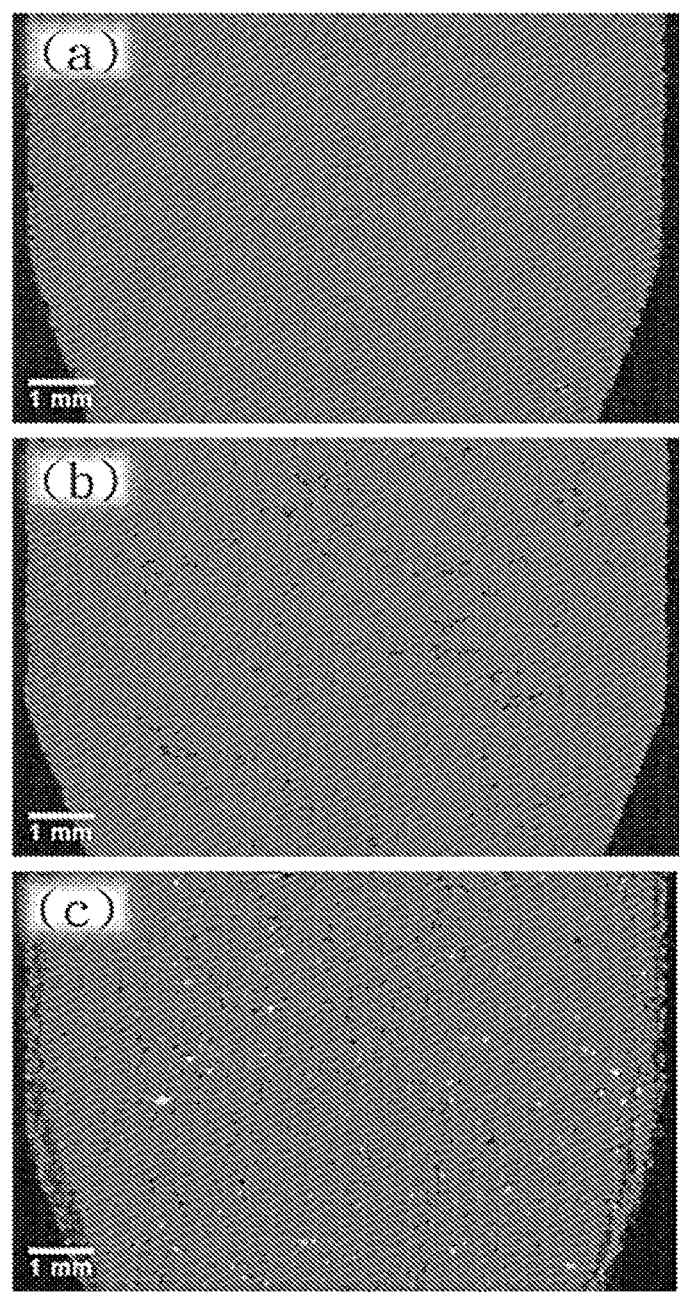

FIG. 8A shows a front CT scan of the test pieces and FIG. 8B shows a side scan of the test pieces. (a) is the scan of the test piece of the composite particle material C1 and it can be seen from the figure that the test piece is not porous. (b) shows the MJF-PA12 test piece and it can be observed that some micro pores inside. (c) shows the Lisa-PA12 printed test piece and many pores are distributed in the test piece. When the number of the pores corresponds to Table 6, the test piece with smaller pores has a higher mechanical strength. When the three test pieces are compared, the test piece prepared from the composite particle material C1 with the smallest pores has a highest tensile strength of 55.55 MPa.

Example 2

In the present example, a general process and a carbon black coating process are respectively used to obtain a composite particle material using TPU at as a polymer powder.

The TPU powder used in the present example is BASF Elastollan® 1180A TPU and has physical properties as follows: a density of 1.11 g/cm$^3$, a Shore hardness of 80 A, a glass transition temperature of −44° C., a tensile strength (23° C.) of 10 MPa, a fracture strain >300%, and a polygonal appearance. A particle size of a TPU powder is analyzed by a laser analyzer to determine that the TPU powder has an average particle size D50 of 55.69 µm and D90 of 103.5 µm.

In a TGA test of the TPU, a heating rate of 20° C. per min is used and heating is performed from room temperature to 600° C. The TGA test result shows that the TPU begins to lose weight at about 250° C., shows a sharp weight change between 300° C. and 400° C., and nearly returns to zero at close to 600° C. Therefore, it can be known that the temperature needs to be set to be within 250° C. in a subsequent DSC test, otherwise there is a risk of cracking. A basic heat change of the material can be known from a DSC test result. Besides, according to the TGA test result, the TPU begins to have a thermogravimetric loss at about 250° C. Therefore, during the DSC test, a heating temperature will be set at 250° C. or less. An analysis is performed when heating is performed to 180° C. at a rate of 10° C. per min. The material absorbs heat at 72.5° C. and 117.05° C. to produce melting peak values, which are respectively a melting point temperature of a soft segment and a melting point temperature of a hard segment in the TPU material. Parameter values are shown in Table 7.

TABLE 7

|  | Initial melting temperature | Melting point (° C.) | Melting end temperature |
|---|---|---|---|
| Soft segment | 57.36° C. | 72.5° C. | 94.05° C. |
| Hard segment | 101.75° C. | 117.05° C. | 125.27° C. |

In addition, in order to reduce a laser reflectivity, the pure TPU powder should be mixed with carbon black. The carbon black used in the example has the following physical properties: a density of 1.7-1.9 g/cm³, a primary particle size of 0.28 µm, and a melting point of more than 3,000° C.

From an analysis result of a spectrometer, it can be seen that if a sintering printing is performed by using an infrared laser with a wavelength of 808 nm, the reflectivities of the TPU powder and the carbon black material under the wavelength are 80.12% and 7.53%, respectively. Therefore, different ratios of the carbon black can be added into the TPU powder to reduce reflection of the TPU, such that the TPU powder may be sintered under a short wavelength laser.

Specific operation methods of the general process and the carbon black coating process are as follows:

General Process:

Carbon black and TPU are put into a mixing mill according to ratios shown in Table 8, and uniformly mixed at a rotation speed of 30 rpm at room temperature. The mixing is continuously performed until the composite powder has a uniform color and no obvious color difference. Then the composite powder is classified by an LS-300T vibration sieve to a desired particle size range to obtain composite particle materials N4 to N6. A 120-mesh sieve is selected for sieving to enable a particle size of the composite particle materials N4 to N6 to be 125 µm or less, agglomerated particles are separated, and a subsequent experiment is performed by using the powder with a particle size meeting an SLS technology.

Carbon Black Coating Process (the Present Invention):

Carbon black and TUP are put into a mixing mill according to ratios shown in Table 8. The carbon black and TUP are mixed uniformly at room temperature (a first temperature), the first temperature is maintained for a first time (30 min) to enable the composite powder to have a uniform color and no obvious color difference, and at this stage, a rotation speed S1 is 5 rpm.

Then a cavity temperature is raised to a second temperature (65° C.) at a speed of 2° C./min, the second temperature is maintained for a second time (5 min), and at this stage, a rotation speed S2 is 10 rpm.

Then the cavity temperature is raised to a third temperature (70° C.) at a speed of 0.5° C./min, the third temperature is maintained for a third time (10 min) to ensure that a temperature of the powder in the cavity all reaches the temperature of the carbon black coating stage, and at this stage, a rotation speed S3 is 40 rpm. An improvement of the rotation speed can increase a mechanical force and a friction between powders, such that a surface of the powder material is softened and the uniformly dispersed carbon black is coated on the surface of the TPU powder. Then the powder is classified by an LS-300T vibration sieve to a desired particle size range to obtain composite particle materials C4 to C6. A 120-mesh sieve is selected for sieving to enable a particle size of the composite particle materials C4 to C6 to be 125 µm or less, agglomerated particles are separated, a subsequent experiment is performed by using the powder with a particle size meeting an SLS technology, and an average yield is 92%.

TABLE 8

|  | General process | | | Carbon black coating process | | |
|---|---|---|---|---|---|---|
|  | Composite particle material | | | | | |
|  | N4 | N5 | N6 | C4 | C5 | C6 |
| TPU (wt %) | 99.8 | 99.6 | 99.4 | 99.8 | 99.6 | 99.4 |
| Carbon black (wt %) | 0.2 | 0.4 | 0.6 | 0.2 | 0.4 | 0.6 |

A reflectivity of TPU powder from a Lisa original factory is measured as shown in Table 9. It can be seen that an average reflectivity is 16.21%, close to the reflectivity of the composite particle material C5. However, since a carbon powder separation phenomenon occurs in the TPU powder from a Lisa original factory, a reflectivity difference is large. Besides, the composite particle material C5 of the present invention is mixed by a mixing mill, such that the carbon black is evenly coated on the powder, the reflectivity is relatively stable, and only a few layering phenomena occur. When the powder is coated by the carbon black, no obvious layering occurs and the reflectivity is reduced.

TABLE 9

| Material | Reflectivity (%) | | | Average value | Difference value |
|---|---|---|---|---|---|
| Lisa TPU | 16.91 | 15.99 | 15.73 | 16.21 | 1.18 |
| Composite particle material N5 | 15.78 | 15.62 | 15.37 | 15.59 | 0.41 |
| Composite particle material C5 | 13.83 | 13.82 | 13.78 | 13.81 | 0.05 |

1. Particle Size Analysis

Figure 9A:
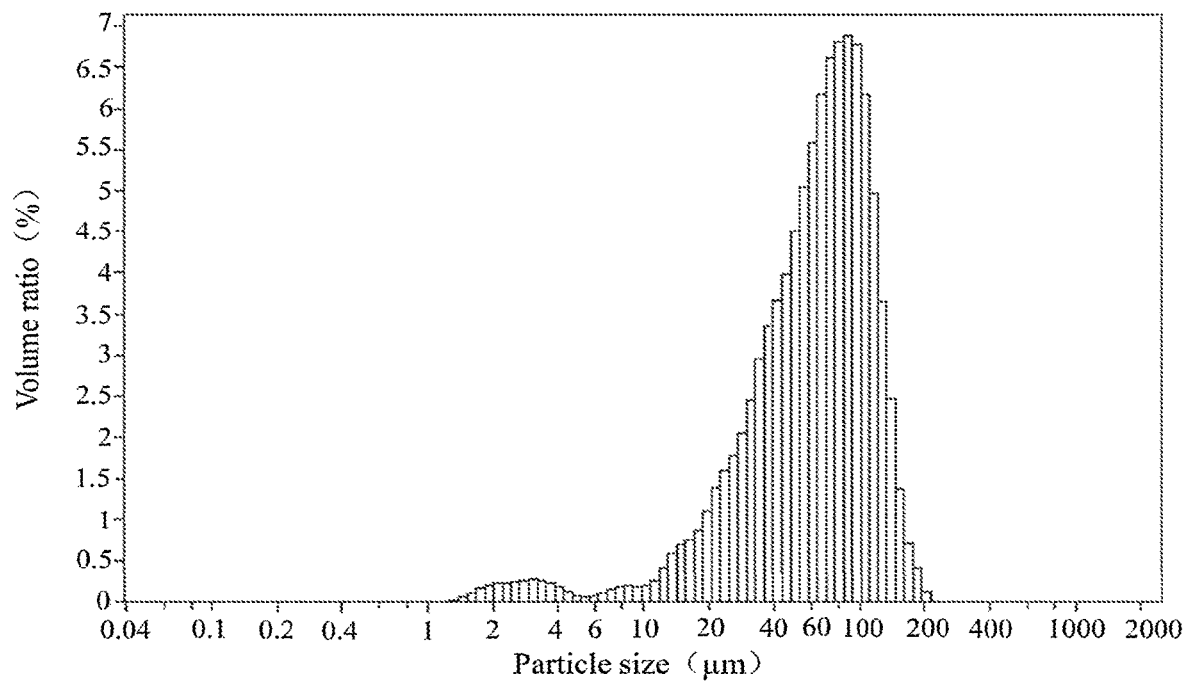
FIGS. 9A and 9B show average particle size distributions of composite particle materials N4 to N6 and composite particle materials C4 to C6 in example 2 respectively.
Figure 9B:
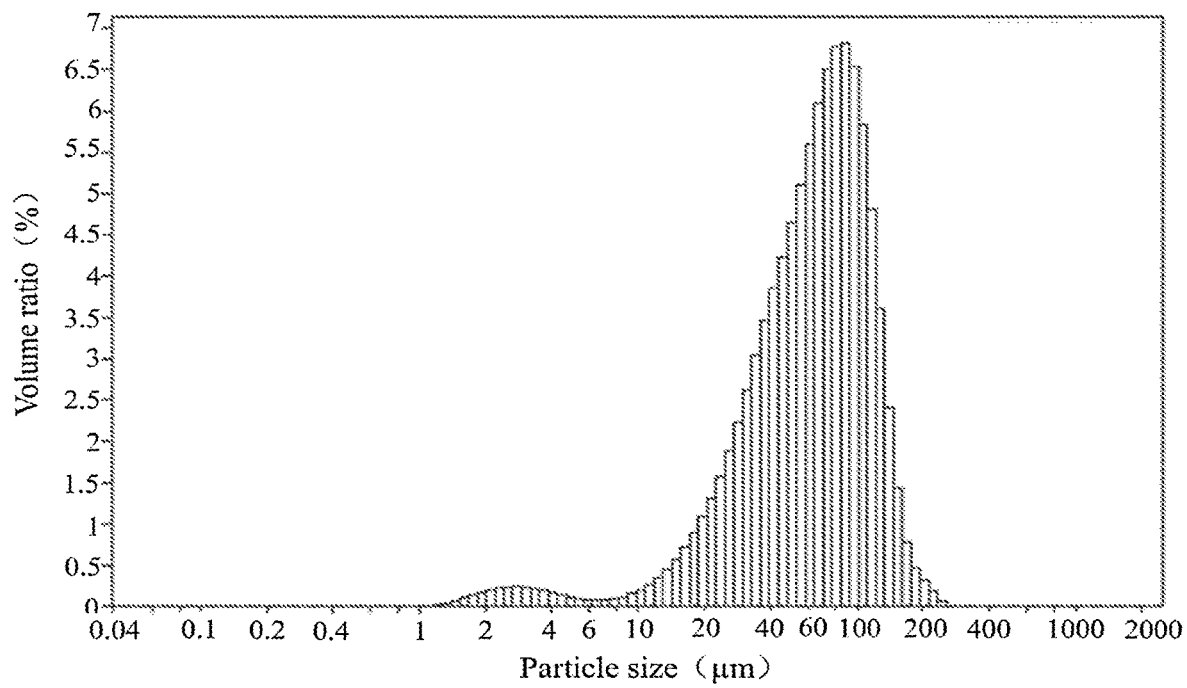

As shown in FIGS. 9A and 9B, particle sizes and distributions of the composite particle materials N4 to N6 and the composite particle materials C4 to C6 are measured by using a Coulter LS230 laser particle size analyzer. The composite particle materials N4 to N6 have an average particle size distribution D50 of 61.54 µm and D90 of 119.1 µm. The composite particle materials C4 to C6 have an average particle size distribution D50 of 61.12 μm and D90 of 120.2 μm. Therefore, it can be seen that there is no significant difference in the particle size and particle size distribution of the composite particle materials prepared by the two processes.

TABLE 10

|  | General process | Carbon black coating process |
|---|---|---|
| D10(μm) | 22.83 | 24.05 |
| D25(μm) | 40.71 | 40.91 |
| D50(μm) | 61.54 | 61.12 |
| D75(μm) | 94.29 | 94.10 |
| D90(μm) | 119.1 | 120.2 |

2. Thermogravimetric Loss Analysis

Figure 10:
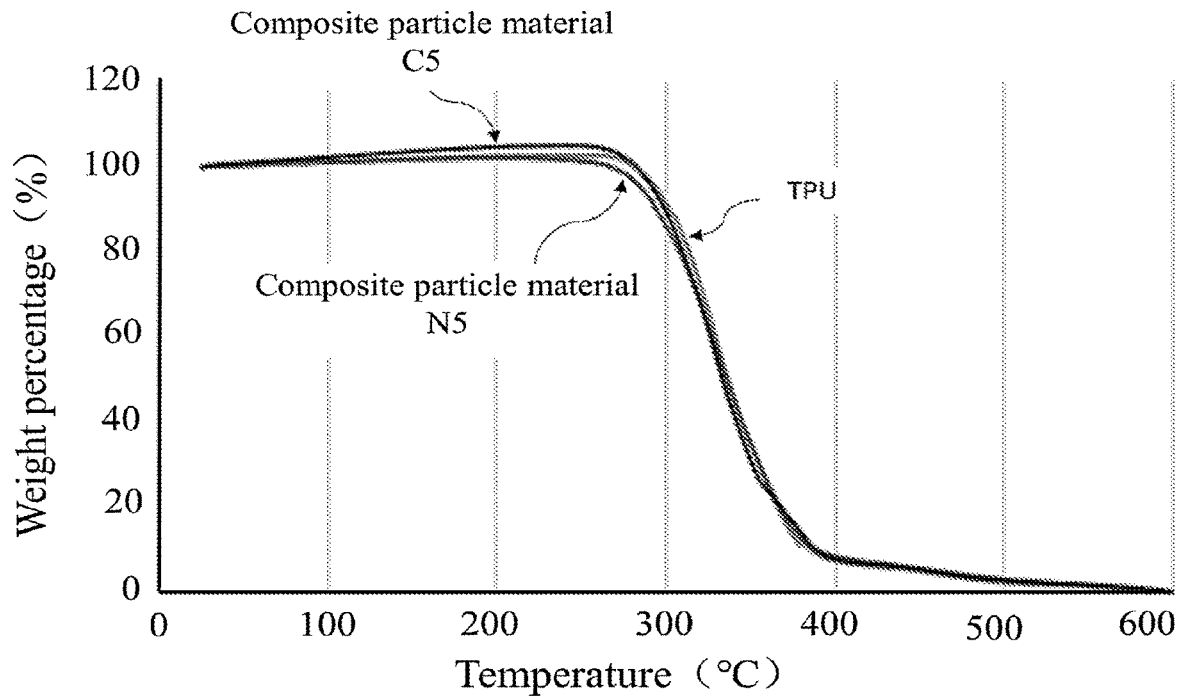
FIG. 10 shows a TGA of 100% TPU, the composite particle material N5, and the composite particle material C5 in example 2.

The 100% TPU, the composite particle material N5, and the composite particle material C5 are measured using a thermogravimetric loss analyzer (TGA). Heating is performed from room temperature to 600° C. at a heating rate of 20° C. per min. The result is shown in FIG. 10. It can be known from FIG. 10 that the three materials are cracked at about 250° C. to lose weight and have an obvious weight change from 300° C. to 400° C. When the temperature reaches 600° C., the weight of the three materials is close to zero. The test result can prove that an addition of the carbon black does not change a thermogravimetric loss.

3. Differential Scanning Calorimetry Analysis

Changes produced after heating are analyzed for the carbon black powder, TPU, composite particle material N5, and composite particle material C5 used in the present invention using a differential scanning calorimetry (DSC) at a heating rate of 10° C. per min from 25° C. to 180° C.

Figure 11A:
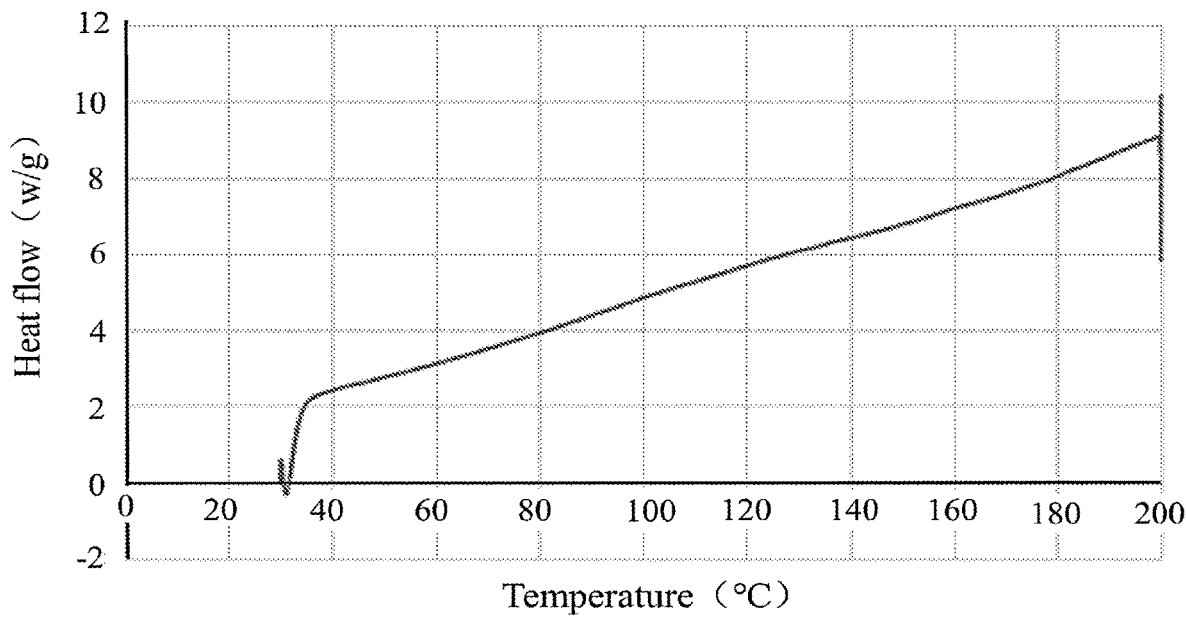
FIGS. 11A and 11B show DSC of carbon black, and the TPU, the composite particle material N5, and the composite particle material C5 in example 2 respectively.
Figure 11B:
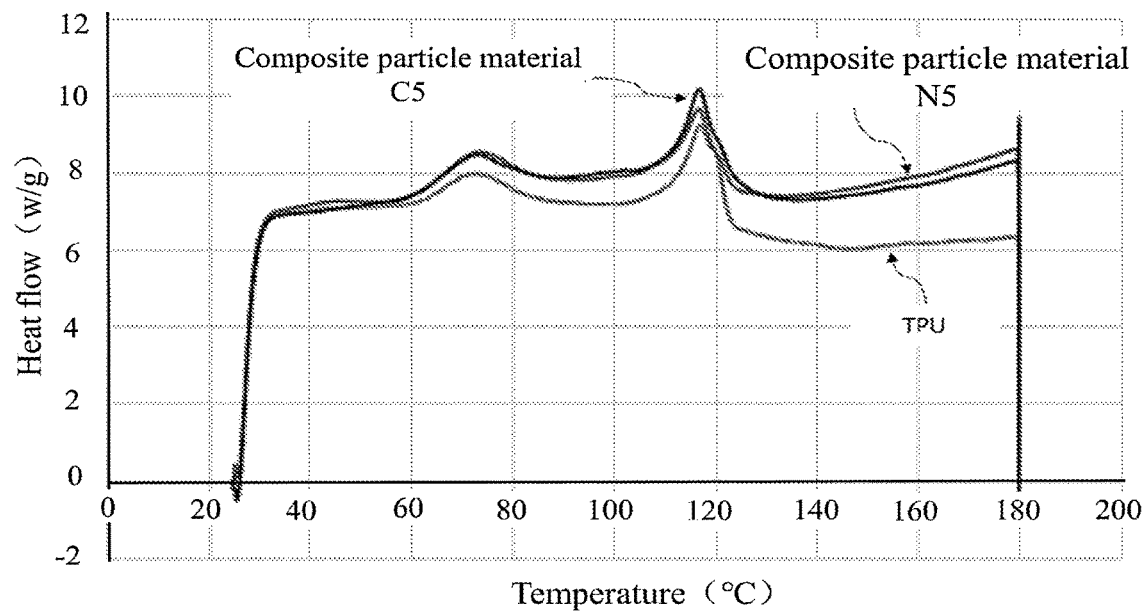

It can be known from FIG. 11A that the carbon black will not produce a phase change due to an increase of a temperature during the heating process, and thus it can be ensured that the carbon black will not change in any way during the printing. FIG. 11B shows that a DSC test result of the general process and the carbon black coating process, a melting trend of a soft segment and a hard segment is similar, and the melting temperatures (as shown in Table 11) have no obvious difference. Therefore, it can be known that the composite powder with an addition of the carbon black has the same thermal properties as the TPU original powder during the heating.

TABLE 11

| Material | | Temperature point | Temperature ° C. |
|---|---|---|---|
| Composite particle material N5 | Soft segment | Initial melting value | 57.07 |
| | | Melting peak value | 72.69 |
| | | Melting end value | 94.48 |
| | Hard segment | Initial melting value | 101.41 |
| | | Melting peak value | 116.75 |
| | | Melting end value | 126.07 |
| Composite particle material C5 | Soft segment | Initial melting value | 56.59 |
| | | Melting peak value | 72.55 |
| | | Melting end value | 94.31 |
| | Hard segment | Initial melting value | 101.93 |
| | | Melting peak value | 116.78 |
| | | Melting end value | 126.24 |

4. Infrared Spectrum Analysis

To ensure that no chemical reaction occurs between the carbon black and the TPU during the process, changes in functional groups of the TPU powder, the commercially available product Lisa TPU, the composite particle material N5, and composite particle material C5 are detected using a Fourier infrared spectrometer.

Figure 12:
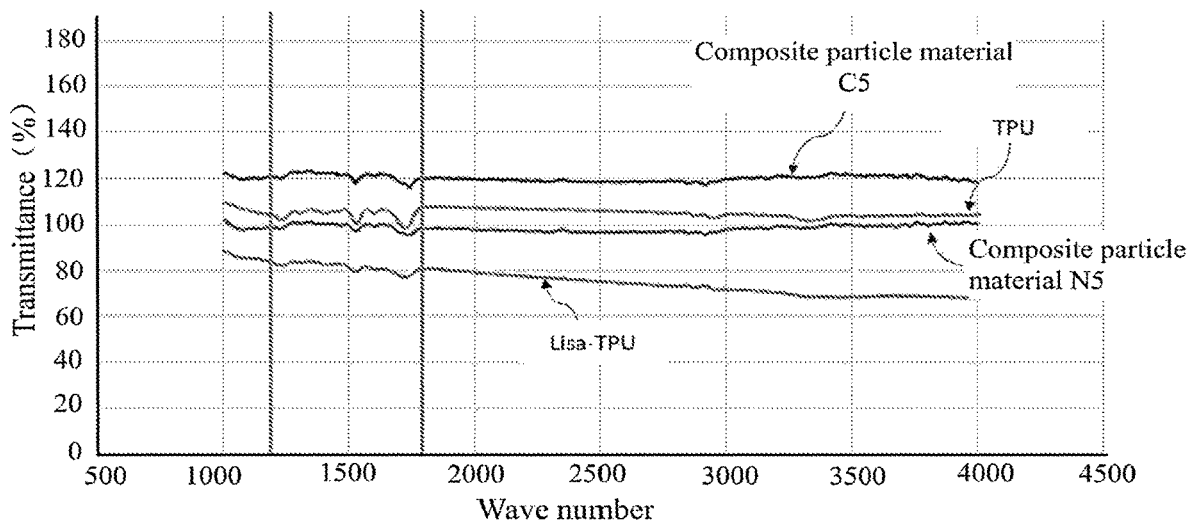
FIG. 12 is an infrared spectrum of the TPU powder, a commercially available product Lisa TPU, and the composite particle material N5 in example 2.

It can be seen from FIG. 12 that the original TPU powder has obvious functional groups (a C—O hard segment) between 1,200 and 1,800, while the composite particle material N5 and the composite particle material C5 have the same trend. Therefore, it can be seen that the addition of the carbon black will not destroy the functional groups of the TPU, such that this process is a physical mixing method. Besides, the composite particle materials have the same functional groups as the commercially available product Lisa TPU and no new functional groups appear.

5. Preheating Temperature Analysis

Before a printing, a preheating temperature can be set based on the thermal properties of the material measured by the DSC. A main purpose of a preheating is to avoid an uneven shrinkage caused by an inconsistent cooling rate during the printing process to affect the subsequent printing. In addition to helping to reduce a power required for laser sintering, the preheating can also prevent warping caused by shrinkage after cooling.

A printing ambient temperature is set based on the DSC test result of the TPU and referring to an initial melting temperature of a soft segment (57° C.). At the beginning, the ambient temperature is tested at 55° C. which is lower than the initial temperature. It is found that a surface of a powder supply groove is wavy after the powder is spread by the powder spreading mechanism. Therefore, the actual ambient temperature will be close to a melting temperature range of a soft segment of the TPU, such that the soft segment of the material slightly melts and is viscous. This will affect an integrity of the powder spreading. Later the preheating temperature is reduced to 50° C. It can be observed that when the preheating temperature is set to be 50° C., after the powder spreading is completed by the powder spreading mechanism, the surface is smooth without waves. Therefore, subsequently, the temperature of the powder supply groove will be set to be 50° C. or less than 50° C. as a reference basis.

After the preheating temperature of the powder supply groove is tested. a temperature of a printing groove is tested. Heating is started at a temperature below an initial melting value of the soft segment. When the set temperature is raised to 100° C., the powder on a surface of the printing groove starts to melt and an actual ambient temperature falls close to a melting temperature range of the hard segment. Therefore, it can be known that a preheating temperature of the printing groove should be less than 100° C. The preheating temperature for the subsequent printing will start at a lowest settable temperature of the printer from 35° C. to 95° C. with an interval of 20° C. as a parameter, and the predicted temperatures are 35° C., 55° C., 75° C., and 95° C. respectively.

6. Forming Feasibility Analysis 4 printing temperature parameters and 3 laser energy densities (as shown in Table 12) are matched with the composite particle material C5, the layer thickness is set according to a parameter of a Lisa original factory. A total of 12 groups of printing parameters are used for a forming feasibility analysis. Forming conditions, tensile strength, and weight and density of test pieces are compared. The tensile test pieces are printed according to an ASTM D638 standard.

TABLE 12

| Groups | Preheating of printing groove (° C.) | Energy density (J/mm²) | Layer thickness (μm) |
|---|---|---|---|
| A | 35 | 0.011 | 125 |
| B |  | 0.028 |  |
| C |  | 0.044 |  |
| D | 55 | 0.011 | 125 |
| E |  | 0.028 |  |
| F |  | 0.044 |  |
| G | 75 | 0.011 | 125 |
| H |  | 0.028 |  |
| I |  | 0.044 |  |
| J | 95 | 0.011 | 125 |
| K |  | 0.028 |  |
| L |  | 0.044 |  |

Figure 13:
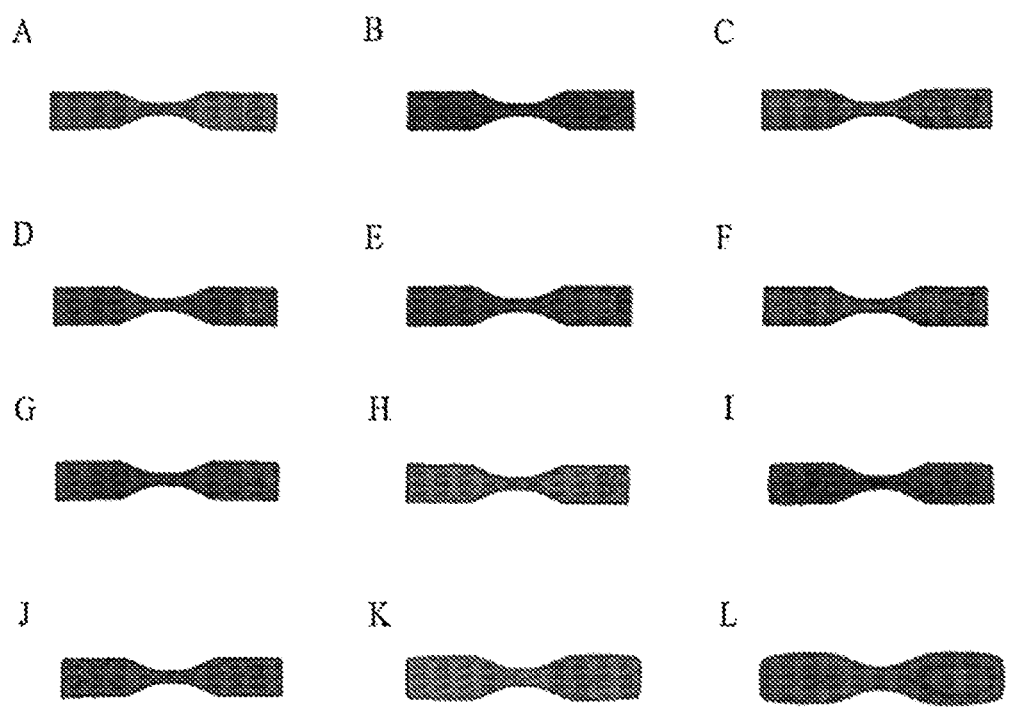
FIG. 13 shows finished products of groups A-L in a forming feasibility analysis of example 2.

After a total of 12 groups from A to L are printed using the parameters, a formability comparison is compared (as shown in FIG. 13). Firstly, whether surfaces of the printed test pieces have an obvious damage and whether an appearance size is abnormal are detected. Only bottom parts of the test pieces of groups I, K, and L are obviously bulged. The size error range is shown in Table 13. The sizes of other 9 groups of the test pieces are normal forming sizes without obvious errors. Therefore, the parameters for normal forming are used as a printing reference for a subsequent experiment.

TABLE 13

| Groups | Theoretical thickness (mm) | Measured thickness (mm) | Error (%) |
|---|---|---|---|
| I | 3.2 | 4.67 | 45.9 |
| K |  | 5.32 | 66.3 |
| L |  | 6.84 | 113.8 |

7. Comparison of Surface Uniformity

Figure 14A:
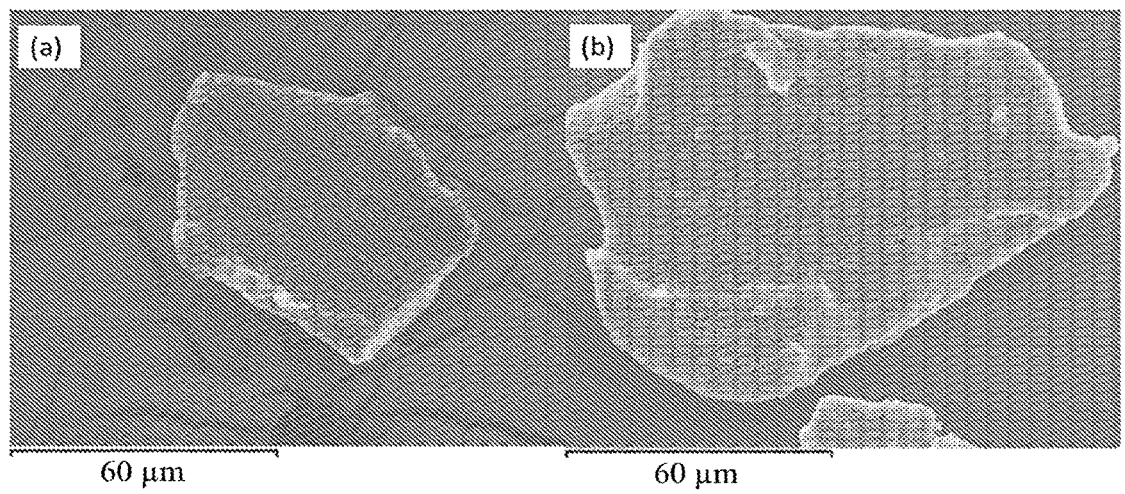
FIGS. 14A and 14B show an SEM mapping of the composite particle material N5($a$) and the composite particle material C5($b$) in example 2 at a magnification of 1,000×, and an SEM mapping of the composite particle material N5($a$) and the composite particle material C5($b$) at a magnification of 3,000× respectively.
Figure 14B:
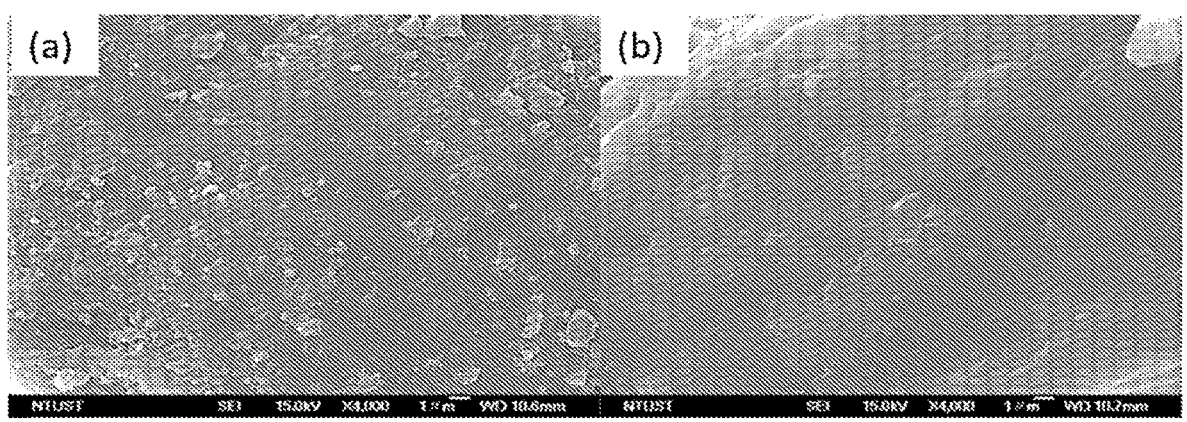

A high-resolution field emission electron microscope JEOL 6500F is used to perform SEM mapping by using an energy dispersive spectrometer (EDS). The distribution of the carbon black dispersed on both the composite particle material N5 and the composite particle material C5 on a surface of powder is observed. FIG. 14A respectively shows an SEM mapping of the composite particle material N5(a) and the composite particle material C5(b) at a magnification of 1,000×. The uniformity of the carbon powder adhered on the surface of the composite particle material N5 is poor, some areas cannot be smoothly adhered by the carbon black, while the black white is uniformly coated on the surface of the carbon black-coated composite particle material C5, such that the composite particle material C5 has a lower reflectivity than that of the composite particle material N5. Furthermore, FIG. 14B respectively shows an SEM mapping of the composite particle material N5(a) and the composite particle material C5(b) at a magnification of 3,000×. After the magnification is increased to 3,000 times, it can be more clearly observed that the surface of the composite powder prepared by the general process presents a flaky grain and particle sense, and the surface of the composite powder coated with the carbon black presents a smooth trend. It can be seen that the composite powder coated with the carbon black can effectively and uniformly coat the TPU powder than the composite powder mixed by the general process.

8. Tensile Strength Comparison 9 groups of forming parameters in the forming feasibility analysis capable of forming are used to print the composite particle material N5 and the composite particle material C5 by using a universal tester, and weight and density of the test pieces are measured as shown in Table 14.

TABLE 14

| Composite particle material N5 | | | Composite particle material C5 | | |
|---|---|---|---|---|---|
| Groups | Weight (g) | Density (g/cm³) | Groups | Weight (g) | Density (g/cm³) |
| A | 0.6519 | 0.41 | A | 0.6824 | 0.43 |
| B | 1.2655 | 0.80 | B | 1.2983 | 0.82 |
| C | 1.5349 | 0.97 | C | 1.5945 | 1.01 |
| D | 0.7833 | 0.50 | D | 0.8659 | 0.55 |
| E | 1.4472 | 0.92 | E | 1.5013 | 0.95 |
| F | 1.6278 | 0.96 | F | 1.7466 | 1.03 |
| G | 0.9436 | 0.60 | G | 1.1006 | 0.70 |
| H | 1.6568 | 1.05 | H | 1.7558 | 1.09 |
| J | 1.4751 | 0.94 | J | 1.5575 | 0.99 |

It can be seen from the results in Table 14 that the composite particles prepared by two different processes both have a highest density in group H. Therefore, the composite particles of group H are used for a tensile test. Strengths of the composite powder prepared from the two processes are compared and the results are recorded in Table 1S.

TABLE 15

| Composite particle material N5 | | | Composite particle material C5 | | |
|---|---|---|---|---|---|
| Groups | Tensile Strength (Mpa) | Reflectivity (%) | Groups | Tensile Strength (Mpa) | Reflectivity (%) |
| H | 5.9 | 15.59 | H | 7.9 | 13.81 |

Figure 15:
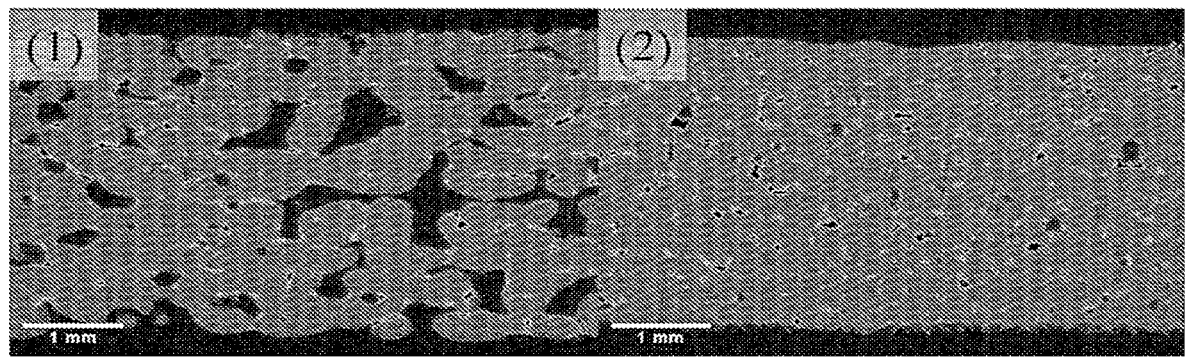
FIG. 15 shows a pore distribution of the test pieces scanned by CT, wherein the test pieces are obtained from the composite particle material N5(1) and the composite particle material C5(2) in example 2 by printing parameters in a group H.

It can be seen from the results in Table 1S that the composite particle material C5 has a relatively strong mechanical value. A main reason is that with the same weight percentage of the carbon black, the carbon powder is more uniformly coated on a surface layer of the composite powder coated with the carbon black than the generally mixed powder, such that a reflectivity is lower. It can be seen from FIG. 15 that the powder prepared by the carbon black coating process has fewer pores than the generally mixed powder and has a performance improved by 33.9%, Therefore, a subsequent experiment is performed with carbon black coated powder.

8. Effect of Printing Layer Thickness

A selection of a layer thickness should be adjusted according to a particle size distribution of powder, a printing layer thickness of laser sintering is generally about 100-150 μm, the layer thickness should be at least twice an average particle size, and changing the printing layer thickness will affect quality of a finished product and printing time. It can be seen in Table 14 above that when a preheating temperature is 75° C. and an energy density is 0.028 J/mm², group H has a better printing quality. Therefore, the printing quality of the carbon black-coated composite powder of the composite particle material C5 in different layer thicknesses will be discussed with this molding parameter and the results are be recorded in Table 16.

TABLE 16

| Groups | Layer thickness (μm) | Density (g/cm³) | Tensile Strength (Mpa) |
|---|---|---|---|
| 1 | 100 | 1.05 | 4.1 |
| 2 | 125 | 1.09 | 7.9 |
| 3 | 150 | 1.07 | 5.7 |

Figure 16:
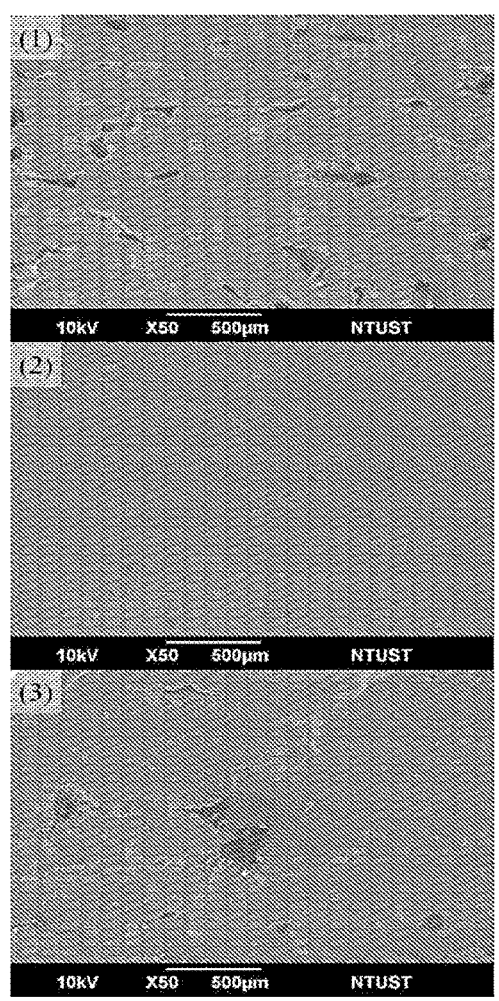
FIG. 16 shows SEM images of different layer thicknesses in an analysis of an effect of a printing layer thickness in example 2.

According to the results in Table 16, it can be known that when the layer thickness is set to be 125 μm, the test piece has a better tensile strength and an interlayer bonding of the test piece is observed by SEM. It can be seen from Table 16 that in the layer thickness setting of group 1, during powder spreading, less than 90% of the powder will remain in a printing area and a printing groove has a low powder accumulation rate. As shown in (1) in FIG. 16, there are many pores in a section of the test piece, resulting in a low tensile strength. It can be observed from (2) in FIG. 16 that in group 2, a binding between layers is good with only a few remaining tiny pores. Since group 3 has a relatively large layer thickness, it can be seen from (3) in FIG. 16 that a laser power cannot completely perform sintering. Therefore, in a subsequent experiment, 125 μm is used as a parameter set for the layer thickness.

9. Analysis of Effects of Printing Parameters

The composite particle material C5 is used. According to a normal forming condition of a forming condition pilot test, a total of 9 groups of the printing parameters are matched with a layer thickness of 125 μm. A tensile test piece ASTM D638 standard will be used for printing. A sintering condition, a tensile strength, and a density will be compared. The specific printing parameters and physical property results of the test pieces are shown in Table 17.

TABLE 17

| | Printing condition | | Physical properties of test piece | | |
|---|---|---|---|---|---|
| Groups | Preheating temperature (° C.) | Energy density (J/mm²) | Density (g/cm²) | Hardness (Shore D) | Tensile strength (Mpa) |
| A1 | 35 | 0.011 | 0.1 | 40.7 | 24 |
| B1 | | 0.028 | 1.8 | 137.3 | 65 |
| C1 | | 0.044 | 3.2 | 164.9 | 72 |
| D1 | 55 | 0.011 | 0.4 | 64.5 | 41 |
| E1 | | 0.028 | 3.1 | 182.4 | 70 |
| F1 | | 0.044 | 5.6 | 271.8 | 74 |
| G1 | 75 | 0.011 | 1.1 | 104.7 | 53 |
| H1 | | 0.028 | 7.9 | 364.9 | 78 |
| J1 | 95 | 0.011 | 4.1 | 248.4 | 70 |

Figure 17:
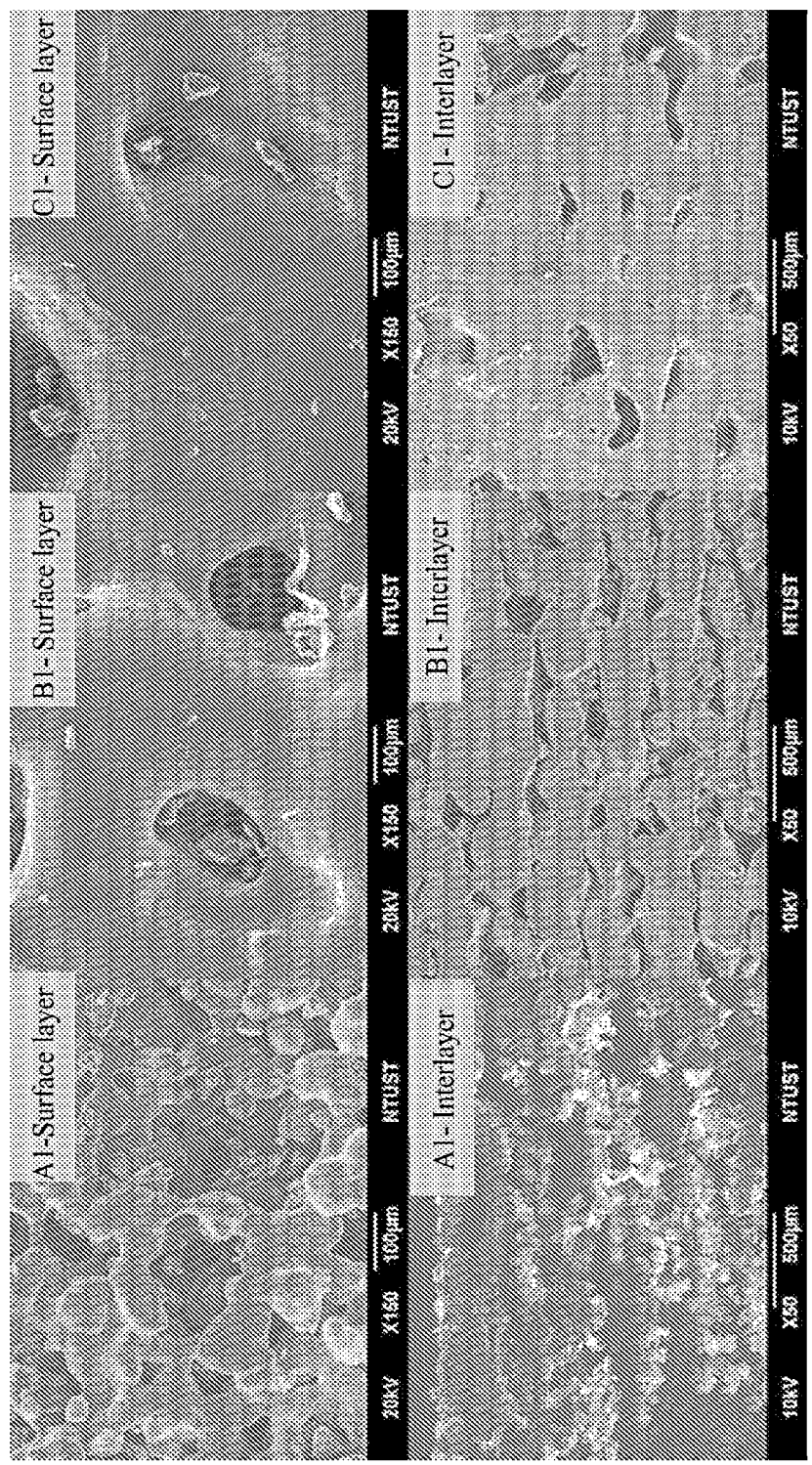
FIG. 17 shows SEM images of groups A1, B1, and C1 in the analysis of an effect of printing parameters in example 2.

With regard to the groups with a preheating temperature of 35° C., a surface layer of group A1 only has some micro-powders in contact to form a sintering neck and presents a considerable number of pores. In an interlayer bonding, a single layer still has a shape of powder particles, and the layers are only slightly bonded together with a relatively large gap (as shown in FIG. 17), resulting in a tensile strength of only 0.1 MPa, an elongation of 40.7%, and a hardness of 24 A. A surface layer of group B1 has an obviously grown sintering neck and only a few deep holes are remained. In an interlayer bonding, a single layer has no shape of powder particles and starts to bond, and layers starts to bind and a gap is decreased (as shown in FIG. 17), resulting in a tensile strength increased from 0.1 Mpa to 1.8 MPa, an elongation increased from 40.7% to 137.3%, and a hardness increased from 24 A to 65 A. A surface layer of group C1 is free of obvious holes, but layers are not completely bound, a concave and convex surface is presented, a multi-layer sintering molding can be seen between layers, but there are still pores (as shown in FIG. 17). A tensile strength increases from 1.8 Mpa to 3.2 MPa, an elongation increases from 137.3% to 164.9%, and a hardness increases from 65 A to 72 A.

Figure 18:
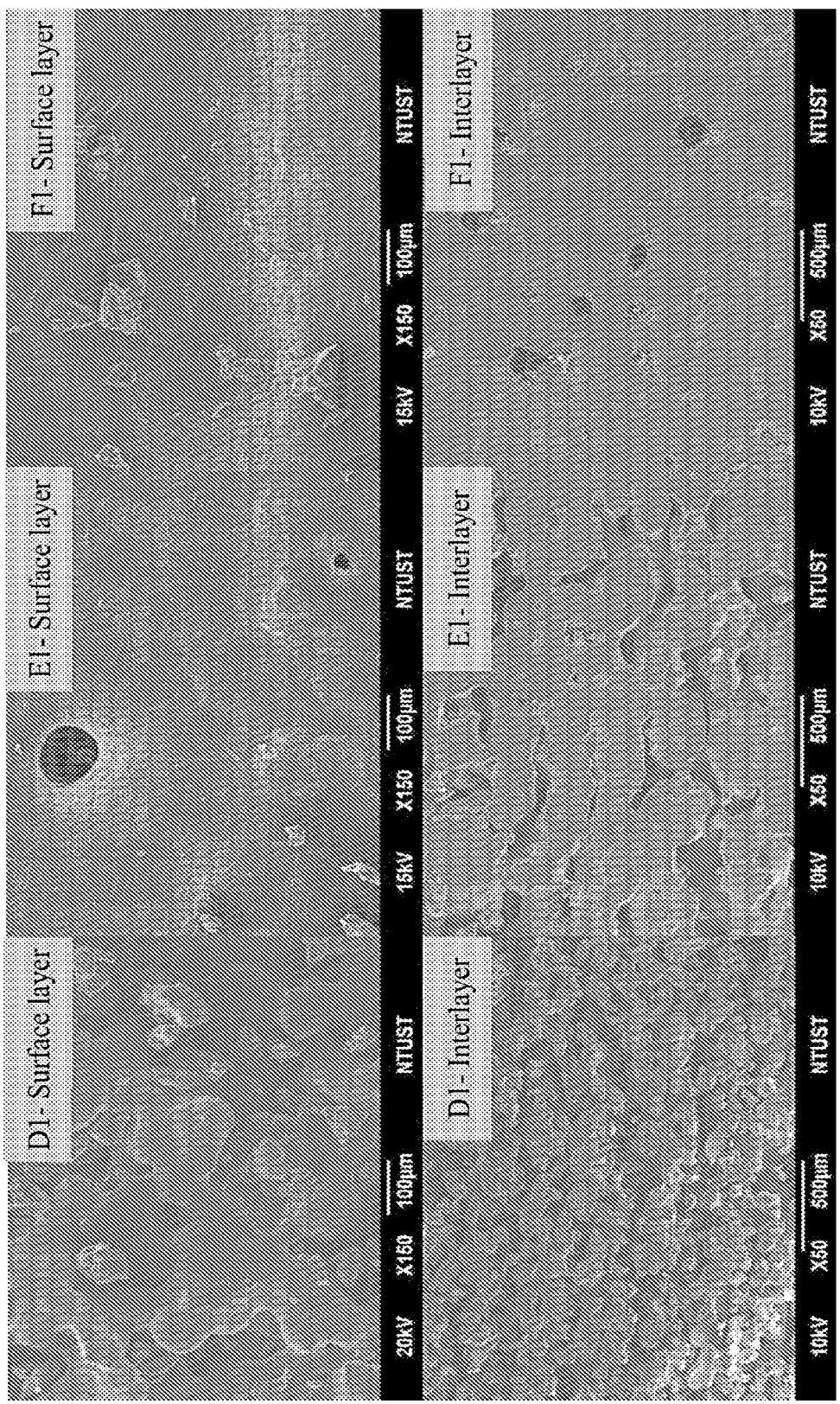
FIG. 18 shows SEM images of groups D1, E1, and F1 in the analysis of an effect of printing parameters in example 2.

With regard to the groups with a preheating temperature of 55° C., surface powder of group D1 has been sintered to be agglomerated, but there are still holes. In an interlayer bonding, a single layer is free of a powder particle appearance, and there is a trend of a slight binding between layers (as shown in FIG. 18). A tensile strength is 0.4 MPa, an elongation is 64.5%, and a hardness is 41A. Surface powder of group E1 is significantly sintered and agglomerated, and only a few holes remain. In an interlayer bonding, a multi-layer sintering molding can be seen, but there are still small gaps (as shown in FIG. 18). A tensile strength increases from 0.4 MPa to 3.1 MPa, an elongation increases from 64.5% to 182.4%, and a hardness increases from 41 A to 70 A. A surface of group F1 is free of obvious holes, but layers are not completely bound, some concave and convex surfaces are presented, it can be seen that there is no obvious layer gap between layers, and only a few pores exist (as shown in FIG. 18). A tensile strength increases from 3.1 MPa to 5.6 MPa, an elongation increases from 182.4% to 271.8%, and a hardness increases from 70 A to 74 A.

Figure 19:
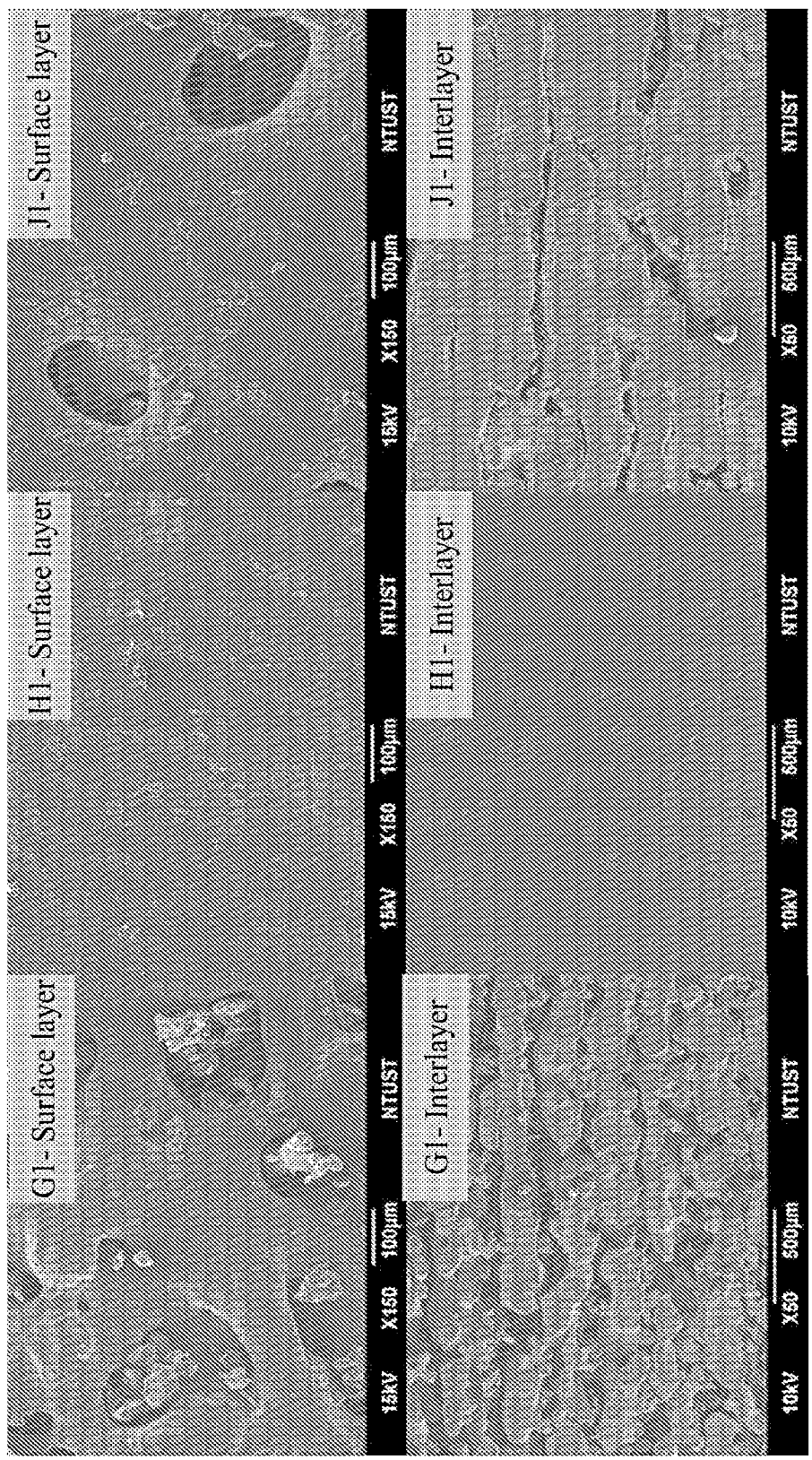
FIG. 19 shows SEM images of groups G1, H1, and J1 in the analysis of an effect of printing parameters in example 2.

With regard to the groups with preheating temperatures of 75° C. and 95° C., surface powder of group G1 has been sintered into large pieces and agglomerated, but some holes exist. In an interlayer bonding, a single layer is free of a powder particle appearance and starts to bind (as shown in FIG. 19). A tensile strength is 1.1 MPa, an elongation is 104.7%, and a hardness is 53A. A surface layer of group H1 presents a large and flat surface with no holes in the surface. However, in an interlayer bonding, there is no obvious layer gap and only a few small pores are remained. It can be seen that the powder has a better flow to promote fusion between powders (as shown in FIG. 19). A tensile strength increases from 1.1 MPa to 7.9 MPa, an elongation increases from 104.7% to 364.9%, and a hardness increases from 53 A to 78 A. A surface layer of group J1 has a large amount of sintered agglomerates, but powder cannot be well melt. Therefore, there are still holes in the surface. A multi-layer sintering molding condition can be seen between layers, but an energy cannot be completely penetrated into a next layer, such that there is a small gap between layers, as shown in FIG. 19.

Figure 20:
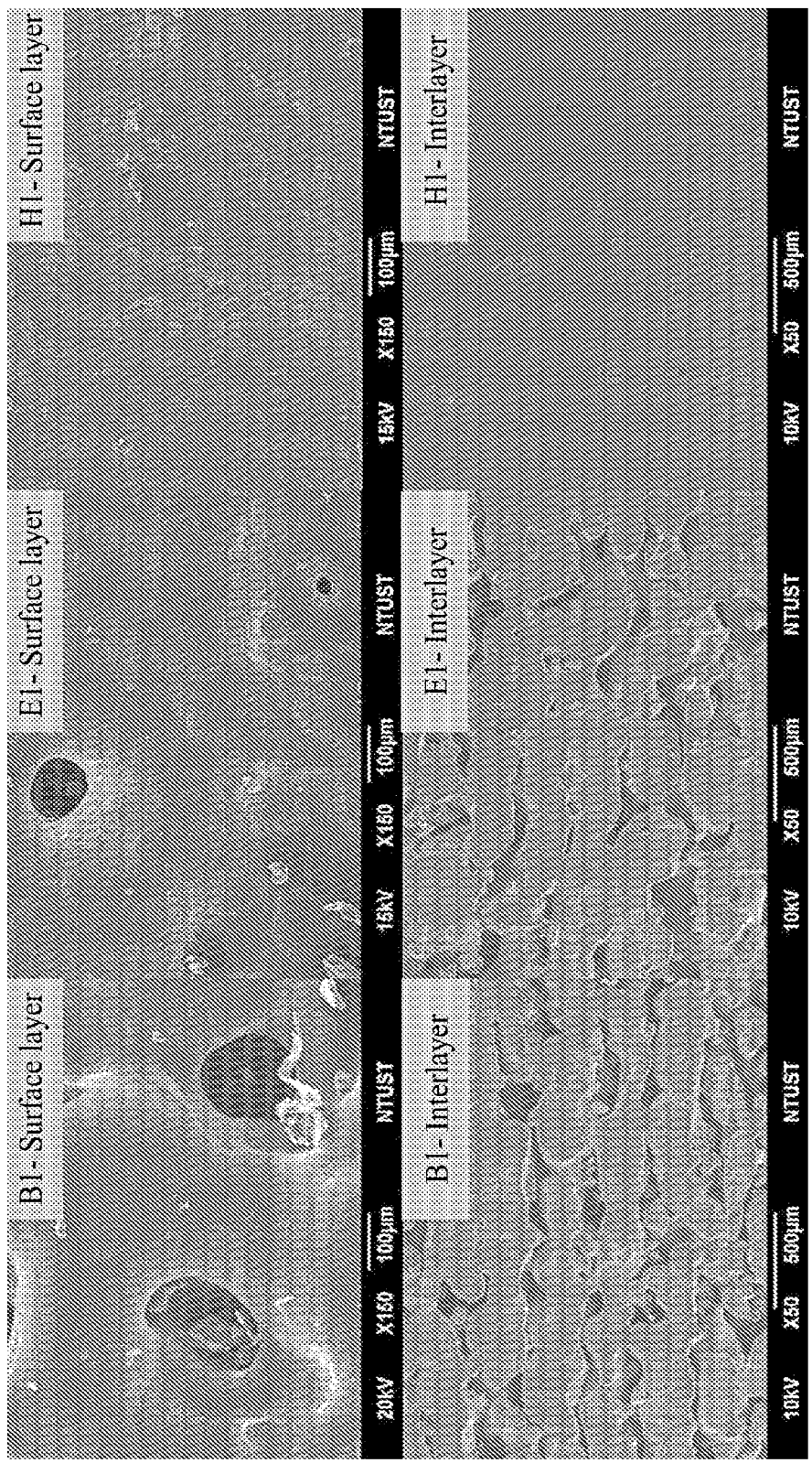
FIG. 20 shows SEM images of groups B1, E1, and H1 in the analysis of an effect of printing parameters in example 2.

With regard to the groups with an energy density of 0.028 J/mm², the energy density of 0.028 J/mm² is fixed and sintering at different printing temperatures is observed (as shown in FIG. 20). As the temperature increases from 35° C. to 75° C., a surface sintering grows obviously from a sintering neck, only a few deep holes are remained, and a large flat surface without holes is formed. In an interlayer bonding, multi-layer sintering forming starts to appear and no obvious layer gap exists. Therefore, a hardness of 65 A, a tensile strength of 1.8 MPa, and an elongation of 137.7% in group B1 increase to a hardness of 78 A, a tensile strength is 7.9 MPa, and an elongation of 364.9% in group H1.

Therefore, it can be seen that with the printing parameters of group H1, a best mechanical strength is obtained.

11. Effects of Carbon Black Ratio on Printing

The respective reflectivity of the composite particle materials C4 to C6 is shown in Table 18.

TABLE 18

| Composite particle material | Carbon black ratio (wt %) | Reflectivity (%) |
|---|---|---|
| C4 | 0.2 | 17.73 |
| C5 | 0.4 | 13.81 |
| C6 | 0.6 | 13.34 |

Additionally, the composite particle materials C4 to C6 with different carbon black ratios are subjected to three-dimensional printing at parameter conditions shown in Table 19 (a spreading layer thickness is 125 μm). Effects on tensile strength, density, and hardness of the printed test pieces are compared. Printing sintering (surfaces and sections of test pieces) is observed by the SEM. Printing conditions and analysis results are shown in Table 19 (non-numerical values indicate that the test pieces cannot be formed).

Physical property test results of the composite particle material C5 can be observed from Table 19. With adjustments of temperatures and energy densities, a tensile strength increases from 0.1 MPa to 7.9 MPa, an elongation increases from 40.7% to 364.9%, a hardness increases from 24 A to 78 A, and a density increases from 0.43 g/cm$^3$ to 1.09 g/cm$^3$. Group H1 with a carbon black ratio of 0.4 wt % has a best forming quality.

Physical property test results of the composite particle material C6 can be observed from Table 19. With adjustments of temperatures and energy densities, a tensile strength increases from 0.1 MPa to 7.1 MPa, an elongation increases from 39.4% to 341.6%, a hardness increases from 24 A to 78 A, and a density increases from 0.43 g/cm$^3$ to 1.08 g/cm$^3$. Group H3 with a carbon black ratio of 0.6 wt % has a best forming quality.

Figure 21:
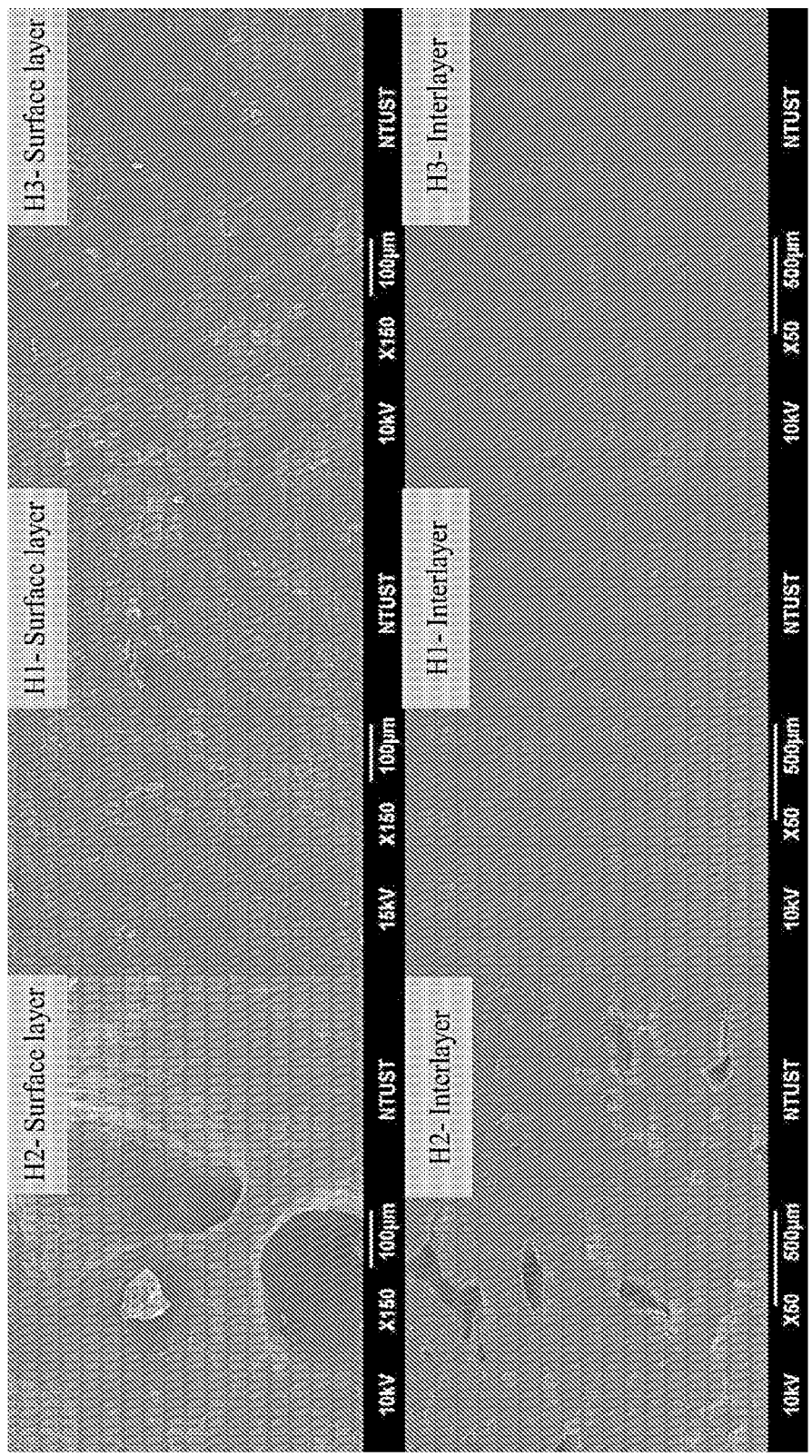
FIG. 21 shows SEM images of groups H1, H2, and H3 in an analysis of an effect of a carbon black ratio on printing in example 2.

Groups H with a best forming quality among the three powders are compared. It can be observed by FIG. 21 that as a reflectivity decreases, a surface layer sintering changes from a concave-convex appearance to a flat sintered surface. In an interlayer bonding, some pores are changed into no obvious layer gap, such that density and hardness are significantly improved. The reflectivity decreases from 17.73% to 13.81%, a tensile strength increases from 6.1

TABLE 19

| Groups | Composite particle material | Preheating temperature (° C.) | Energy density (J/mm$^2$) | Tensile Strength (Mpa) | Elongation (%) | Hardness (Shore A) | Density (g/cm$^3$) |
|---|---|---|---|---|---|---|---|
| A1 | C5 | 35 | 0.011 | 0.1 | 40.7 | 24 | 0.43 |
| B1 | | | 0.028 | 1.8 | 143.9 | 65 | 0.82 |
| C1 | | | 0.044 | 3.2 | 206.2 | 72 | 1.01 |
| D1 | | 55 | 0.011 | 0.4 | 64.5 | 41 | 0.55 |
| E1 | | | 0.028 | 3.1 | 182.4 | 70 | 0.95 |
| F1 | | | 0.044 | 5.6 | 271.8 | 74 | 1.03 |
| G1 | | 75 | 0.011 | 1.1 | 104.7 | 53 | 0.70 |
| H1 | | | 0.028 | 7.9 | 364.9 | 78 | 1.09 |
| J1 | | 95 | 0.011 | 4.1 | 248.4 | 70 | 0.99 |
| A2 | C4 | 35 | 0.011 | — | — | — | — |
| B2 | | | 0.028 | 1.5 | 137.7 | 59 | 0.79 |
| C2 | | | 0.044 | 2.1 | 190.5 | 66 | 0.94 |
| D2 | | 55 | 0.011 | 0.3 | 58.6 | 30 | 0.48 |
| E2 | | | 0.028 | 2.7 | 164.1 | 68 | 0.93 |
| F2 | | | 0.044 | 3.4 | 193.8 | 72 | 1 |
| G2 | | 75 | 0.011 | 0.6 | 92.1 | 45 | 0.61 |
| H2 | | | 0.028 | 6.1 | 320.7 | 74 | 1.01 |
| J2 | | 95 | 0.011 | 3.5 | 224.6 | 62 | 0.97 |
| A3 | C6 | 35 | 0.011 | 0.1 | 39.4 | 24 | 0.43 |
| B3 | | | 0.028 | 1.7 | 141.4 | 64 | 0.81 |
| C3 | | | 0.044 | 3.2 | 205.3 | 72 | 0.97 |
| D3 | | 55 | 0.011 | 0.4 | 64.1 | 41 | 0.54 |
| E3 | | | 0.028 | 2.9 | 180.7 | 70 | 0.95 |
| F3 | | | 0.044 | 4.8 | 260.2 | 74 | 1.03 |
| G3 | | 75 | 0.011 | 1 | 102.5 | 53 | 0.69 |
| H3 | | | 0.028 | 7.1 | 341.6 | 78 | 1.08 |
| J3 | | 95 | 0.011 | 4.1 | 245.9 | 70 | 0.99 |

It can be observed from Table 19 that the composite particle material C4 cannot be printed and formed in an experimental group A2. A main reason is that the composite particle material C4 has a higher reflectivity than the composite particle material C5 and the composite particle material C6, with a value of 17.73%. With adjustments of temperatures and energy densities, a tensile strength increases from 0.3 MPa to 6.1 MPa, an elongation increases from 58.6% to 320.7%, a hardness increases from 30 A to 74 A, and a density increases from 0.48 g/cm$^3$ to 1.01 g/cm$^3$. Group H2 with a carbon black ratio of 0.2 wt % has a best forming quality.

Figure 22:
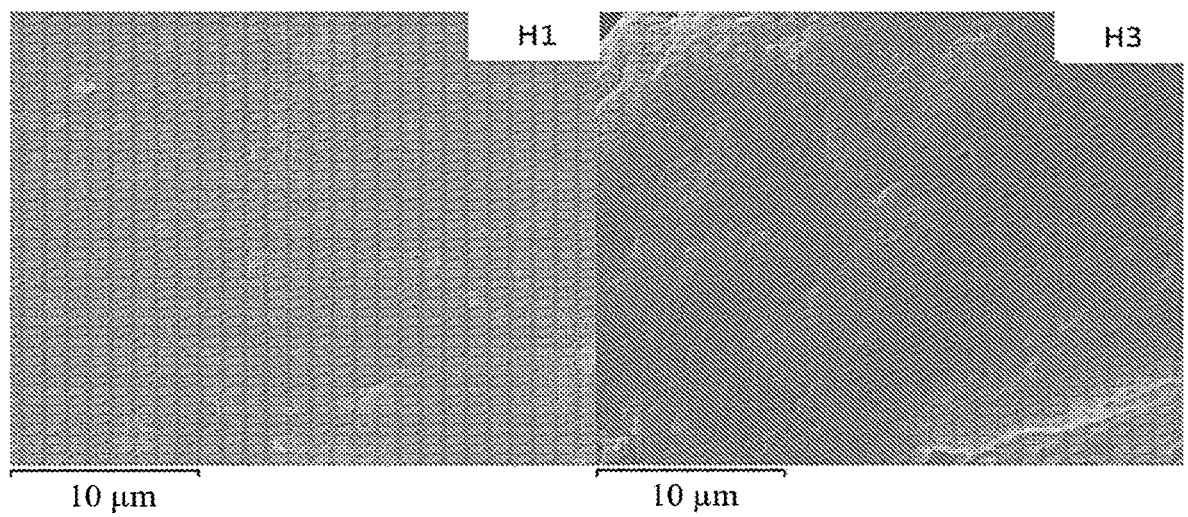
FIG. 22 shows SEM mapping of groups H1 and H3 in the analysis of an effect of a carbon black ratio on printing in example 2.

MPa to 7.9 MPa, and an elongation increases from 320.7% to 364.9%. However, when the reflectivity decreases to 13.34%, the tensile strength decreases to 7.1 MPa, and the elongation decreases to 341.6%. From an analysis of a carbon distribution on a powder surface using SEM mapping in FIG. 22, it can be seen that although the composite particle material C6 and the composite particle material C5 have a similar reflectivity, there are more carbon black adhered on a surface of the composite particle material C6, such that a contact area of the powder during melting is smaller than that of the composite particle material C5, resulting in the decrease of the tensile strength. It can be known that the reflectivity and an addition amount of the carbon black enable the composite particle material C5 to have a best density, elongation, hardness, and tensile strength.

10. Comparison with Commercially Available Product

Figure 23:
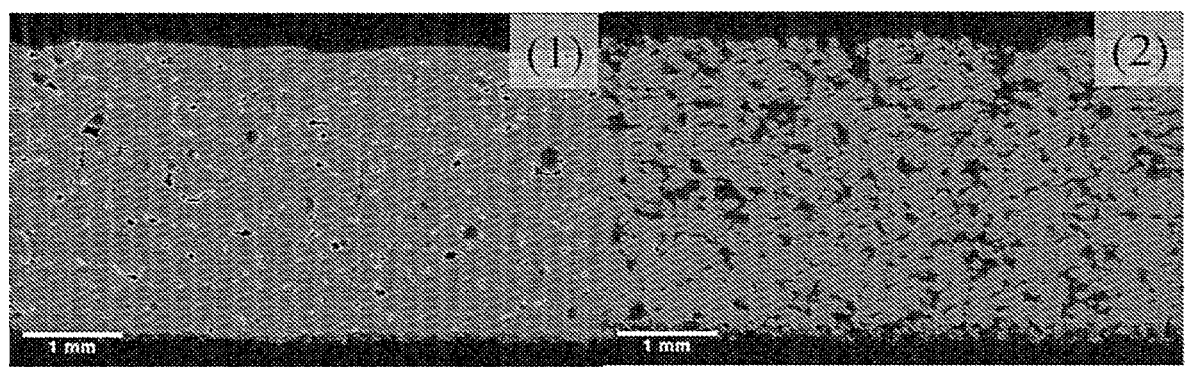
FIG. 23 shows a front CT scan of the composite particle material C5 test piece (1) and a Sinterit TPU printed test piece (2) in a comparison analysis with a commercially available product in example 2.

The composite particle material C5 with a preheating temperature of 75° C. and an energy density of 0.028 J/mm², and Sinterit Lisa TPU with parameters set by an original factory are printed. A Bruker Skyscan 1276 micro-computed tomography scanner is used. It can be seen from FIG. 23 that the Sinterit TPU has more holes distributed and the composite particle material C5 only has some small holes. The composite particle material C5 has a maximum tensile strength of 7.9 MPa and the Sinterit TPU has a tensile strength of 6.3 MPa, Therefore, it can be known that the powder coated with the carbon black has a better bonding in the sintering process.

11. 3D Object Printing Test

Figure 24:
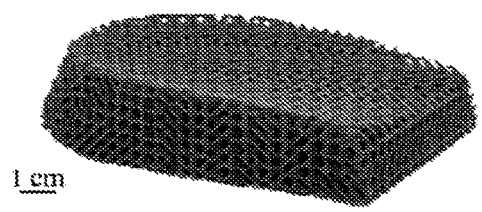
FIG. 24 shows finished products in a 3D object printing test in example 2.
Figure 24:
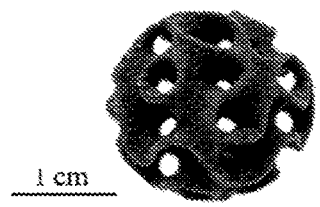
Figure 24:
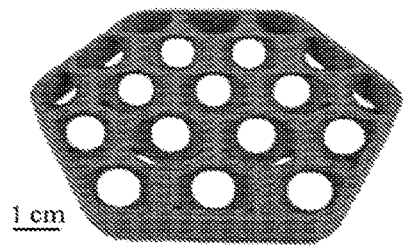

Group H with a highest density experimental parameter, a print temperature of 75° C., an energy density 0.028 J/mm², and a layer thickness of 125 μM, and the composite particle material C5 are used for 3D object printing, as shown in FIG. 24. The composite particle material C5 is used to print an object with a lattice structure, residual powder in pores can be successfully removed from a formed object, a finished product has a complete appearance and a good powder binding, and a characteristic of an elastic material when an external pressure is applied can be successfully displayed.

As described above, the content of the present invention has been specifically exemplified in the above-exemplified examples, but the present invention is not limited to the embodiments. A person skilled in the art to which the present invention pertains should understand that various changes and modifications can be made without departing from the spirit and scope of the present invention. For example, the technical contents exemplified in the foregoing examples are combined or changed to become a new embodiment, and these embodiments are of course considered as belonging to the present invention. Therefore, the scope of protection to be covered in this case also includes the scope of the claims described below and the scope defined by them.

What is claimed is:

1. A preparation method for a polymer composite particle material, wherein the polymer composite particle material can be used as a material in three-dimensional printing for improving mechanical property of a three-dimensional printed finished product; the preparation method comprises the following steps:
   a first heating step: putting a polymer powder and a carbon powder into a mixing mill, and performing mixing for a first time under a condition that a cavity temperature of the mixing mill is a first temperature;
   a second heating step: raising the cavity temperature of the mixing mill from the first temperature to a second temperature at a speed of 1-10° C./min, and maintaining the second temperature for a second time; and
   a third heating step: raising the cavity temperature of the mixing mill from the second temperature to a third temperature at a speed of 0.1-5° C./min, and maintaining the third temperature for a third time to obtain the polymer composite particle material for three-dimensional printing, wherein
   when the first temperature, the second temperature, and the third temperature are set to be T1, T2, and Ta3 respectively, and a melting point of the polymer powder is set to be Tm, T1, T2, T3, and Tm satisfy the following relational expressions:

$$1/4T1 \le T1 \le 3/4T1;$$
$$0 \le Tm - T2 \le 20; \text{ and}$$
$$5 \le T3 - T2 \le 30;$$

when the first time, the second time, and the third time are set to be X1, X2, and X3 respectively, X1, X2, and X3 satisfy the following relational expressions:

$$30 \text{ min} \le X1 + X2 + X3 \le 200 \text{ min, and}$$
$$X1, X2, \text{ and } X3 \text{ are all not zero.}$$

2. The preparation method for a polymer composite particle material according to claim 1, wherein the first heating step further comprises raising the cavity temperature from room temperature to the first temperature at a speed of 1-10° C./min.

3. The preparation method for a polymer composite particle material according to claim 1, wherein when a rotation speed in the first heating step is set to be S1, a rotation speed in the second heating step is set to be S2, and a rotation speed in the third heating step is set to be S3, S1, S2, and S3 satisfy the following relational expressions:

$$S1 > S2 > S3.$$

4. The preparation method for a polymer composite particle material according to claim 1, wherein a weight ratio of the polymer powder to the carbon powder is between 98:2 and 99.9:0.1.

5. The preparation method for a polymer composite particle material according to claim 1, wherein the polymer powder has D50 of 40-60 micrometers and D90 of 90-110 micrometers.

6. The preparation method for a polymer composite particle material according to claim 1, wherein the carbon powder has an average particle size of 500 nm or below.

7. The preparation method for a polymer composite particle material according to claim 1, wherein the polymer powder is selected from at least one of poly-amide-6 (PA-6), polyamide-66 (PA-66), polyamide-610 (PA-610), polyamide-1010 (PA-1010), polyamide-11 (PA-11), polyamide-12 (PA-12), polyamide-9 (PA-9), poly-amide-612 (PA-612), polyamide-121 (PA-121), polyphthalamide (PPA), poly(p-phe-nylene terephthalamide) (PPTA), and thermoplastic polyurethane.

8. The preparation method for a polymer composite particle material according to claim 1, wherein the polymer composite particle material has a laser reflectivity of 0.5 time or less of that of the polymer powder.

\* \* \* \* \*